United States Patent [19]

Collins et al.

[11] Patent Number: 4,675,750

[45] Date of Patent: Jun. 23, 1987

[54] VIDEO COMPRESSION SYSTEM

[75] Inventors: Galen R. Collins, San Jose; Alberto G. Garcia, Santa Clara, both of Calif.

[73] Assignee: Fuji Photo Film Co., Ltd., Kanagawa, Japan

[21] Appl. No.: 666,539

[22] Filed: Oct. 30, 1984

[51] Int. Cl.$^4$ .............................................. H04N 5/92
[52] U.S. Cl. ..................................... 360/9.1; 360/32; 358/135
[58] Field of Search ............................. 360/9.1, 8, 32; 358/260, 135, 133; 375/27; 364/727; 340/347 DD

[56] References Cited

U.S. PATENT DOCUMENTS

| | | | |
|---|---|---|---|
| 3,035,121 | 5/1962 | Schreiber | 358/135 |
| 3,803,348 | 4/1974 | Limb | 358/135 |
| 4,027,331 | 5/1977 | Nicol | 358/135 |

Primary Examiner—Alan Faber
Attorney, Agent, or Firm—Sughrue, Mion, Zinn, Macpeak, and Seas

[57] ABSTRACT

Video compression is achieved by taking the Hadamard transform of video data, comparing Hadamard coefficients from consecutive lines, encoding the changed coefficient values via an entropy coding technique, removing superfluous bits and storing the data on a magnetic tape. The stored data can then be reproduced, unpacked and decoded to regenerate the original video data signals, thereby achieving a very high degree of compression with little or no degradation of image quality.

25 Claims, 20 Drawing Figures

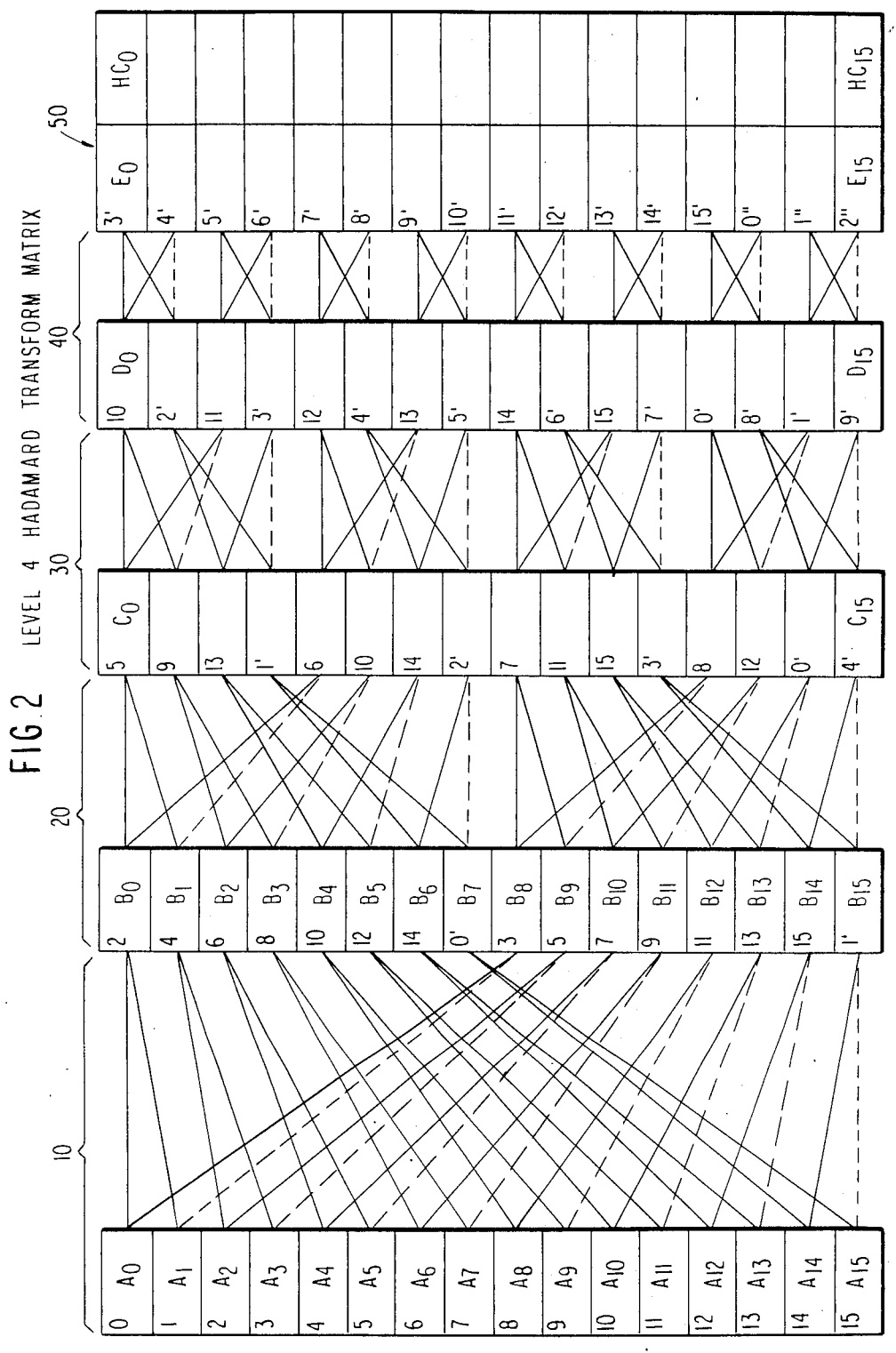

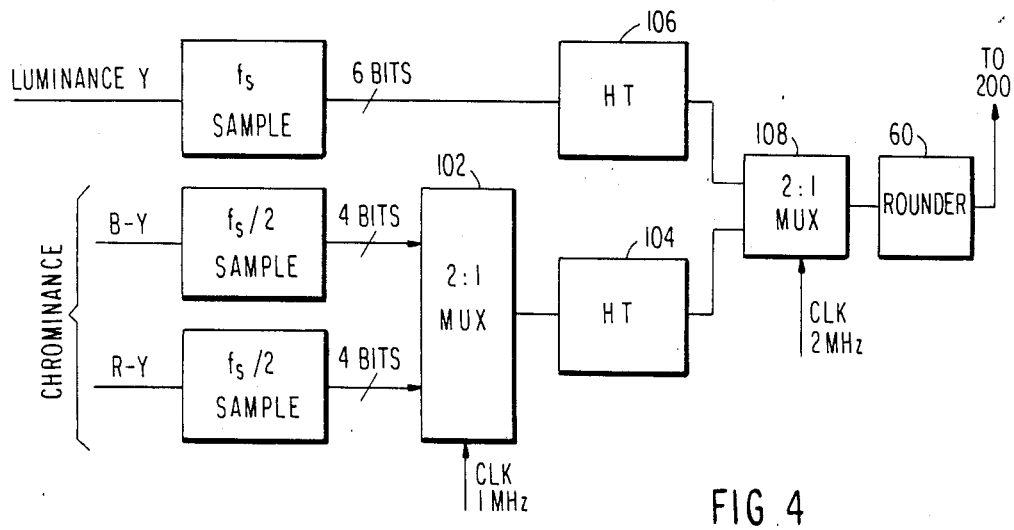
FIG. 4
FIG. 6
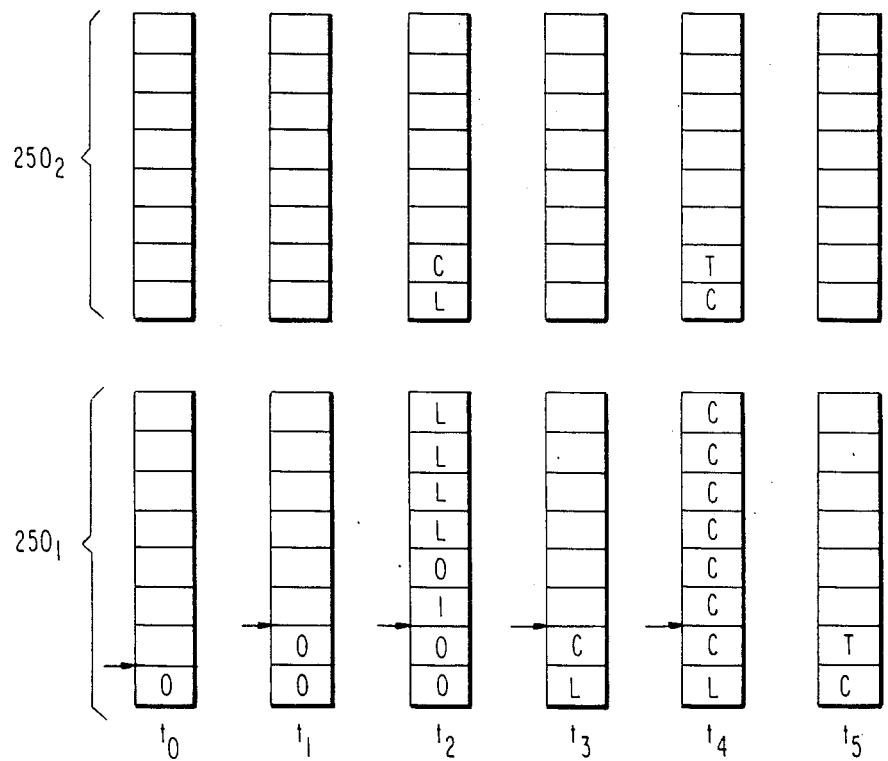

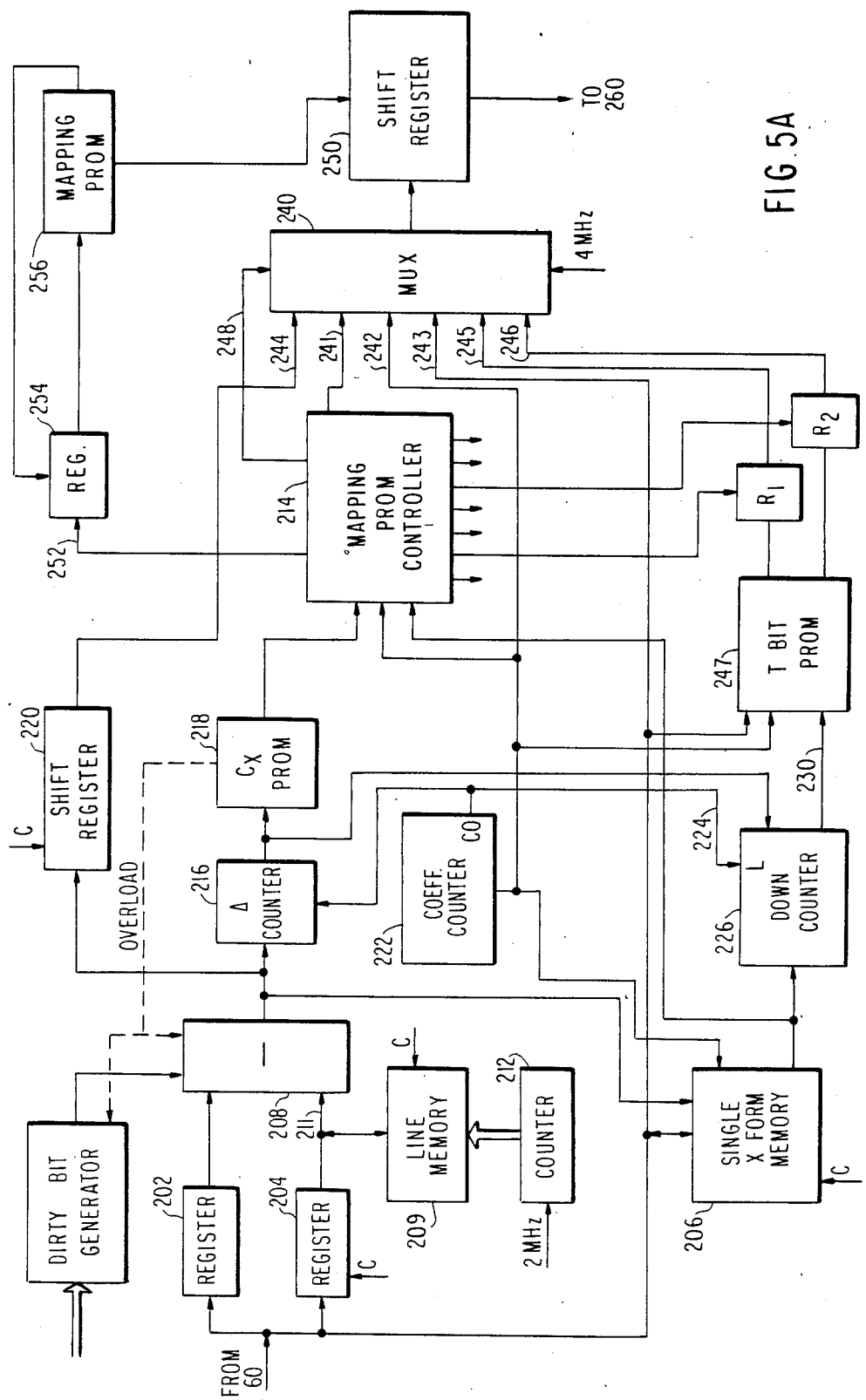

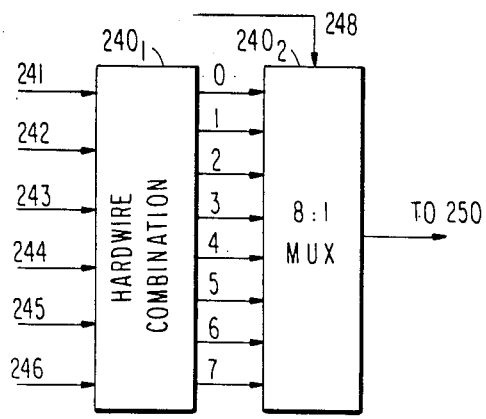
FIG. 5B
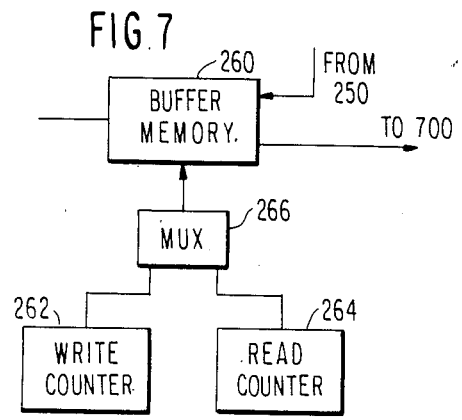
FIG. 7
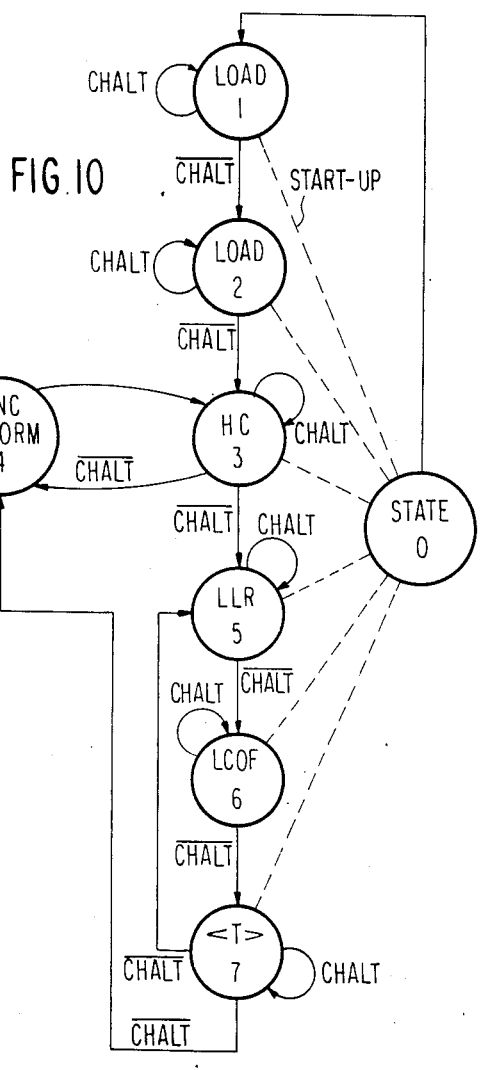
FIG. 10
FIG. 11A
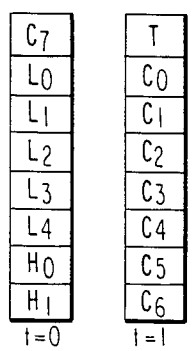
FIG. 11B
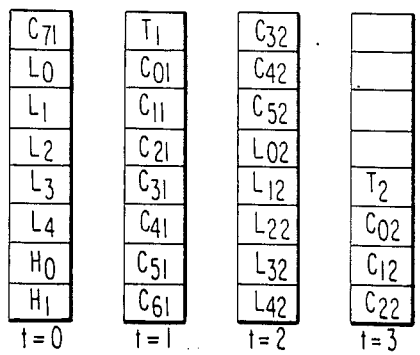

| FIG.9A | FIG.9B | FIG.9C | FIG.9D |

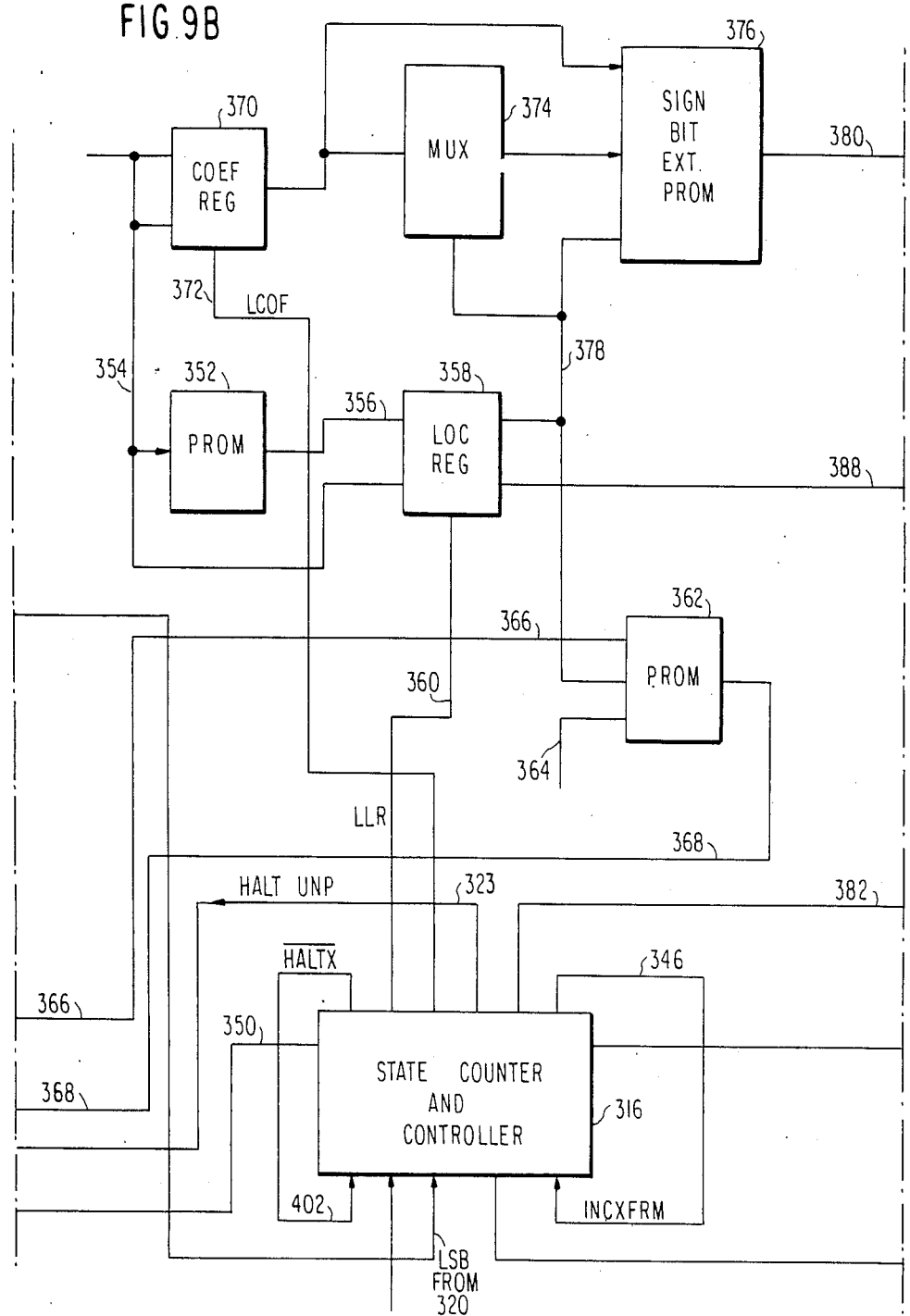

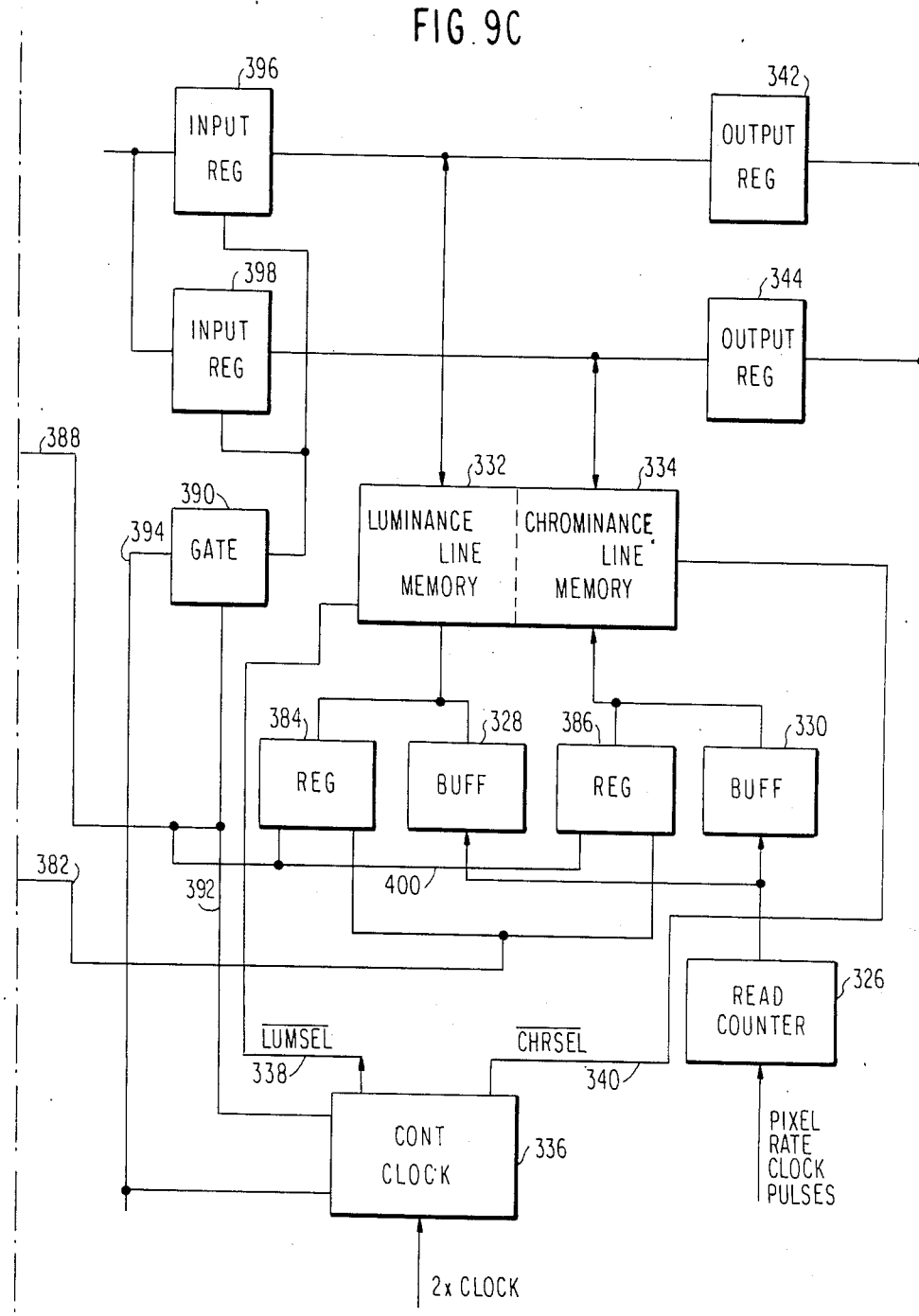

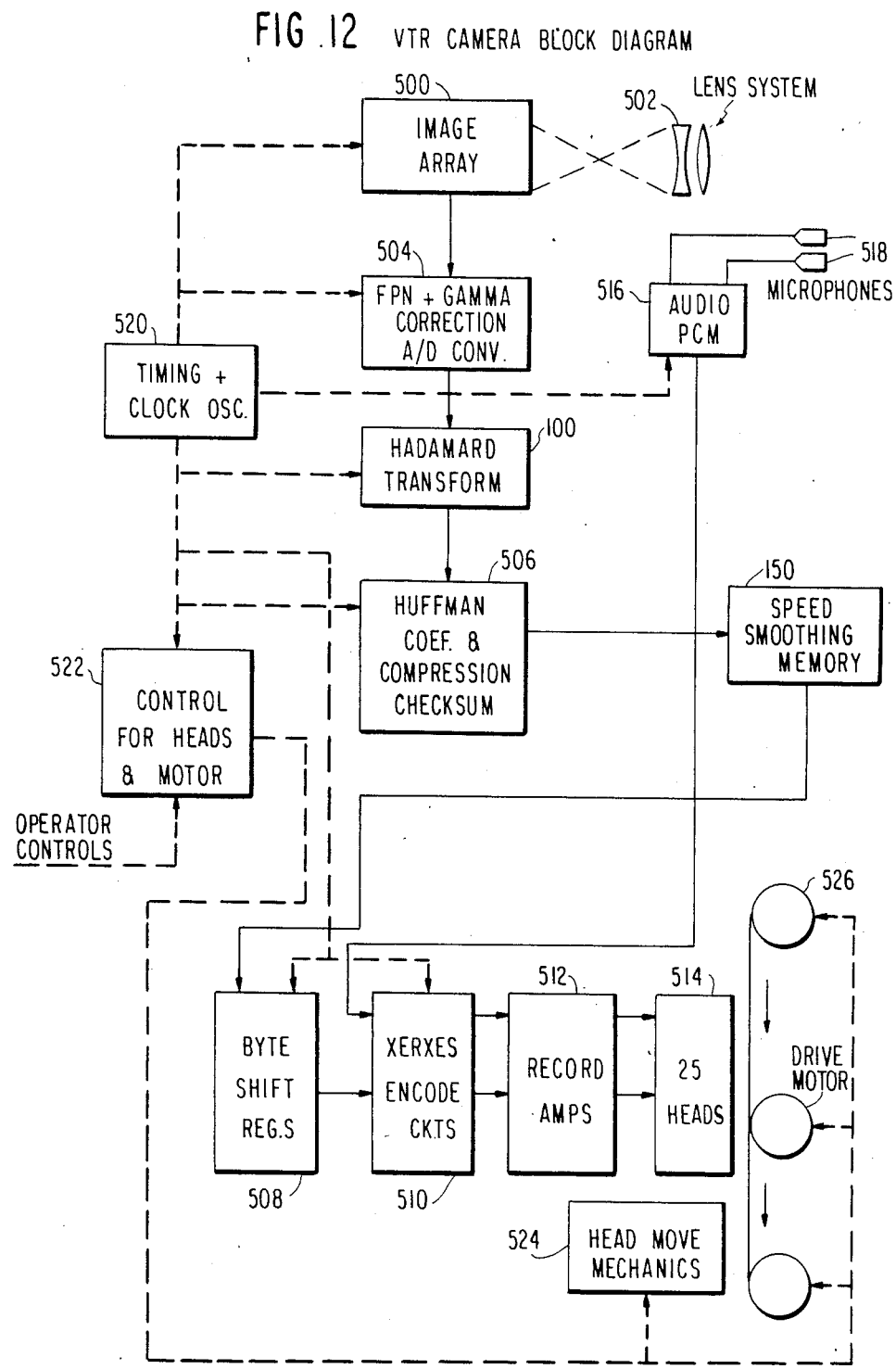
FIG. 12 VTR CAMERA BLOCK DIAGRAM

VIDEO COMPRESSION SYSTEM

BACKGROUND OF THE INVENTION

This application is directed to a video signal compression system, and more particularly to the compression of video information signals to permit recording of video information at high speed and on a smaller recording area.

Home video systems have recently become quite popular, with the user being provided with a video cassette player and a portable video camera which will record video information on a magnetic tape cassette to be later played back and displayed on a home television receiver.

A conventional image pick-up device may include 242 rows of 256 pixels each, or a total of 61,952 pixels for each frame of video information. If the display device displays 30 frames per second, the data to be recorded on the tape may be 1.8 million pixels per second. If the fields are not interlaced in the display processing, 60 frames per second may be required thus doubling the pixel data rate. If each pixel is represented by, e.g. 8 bits, one can see that the bit rate would be extremely high. This has led to the requirement of high speed recording circuitry and large capacity recording tapes. For this reason, conventional VTR devices have been quite bulky and difficult to incorporate into a small hand-held camera. A typical arrangement would have the imaging system in the camera connected via a cable hook-up to a recorder carried by a shoulder strap.

Even if the recorder electronics are made as small as possible, conventional recording techniques still require a substantial storage area and therefore have used relatively large cassette tapes. Even assuming that the recorder electronics could be incorporated into the camera body, a camera large enough to accommodate a typical video cassette tape would still be quite cumbersome.

It would be desirable, therefore, to provide a video signal processing system which is capable of recording the video image data in a much smaller recording area without sacrificing image integrity, thereby enabling the use of a very small cassette tape, e.g. similar in size to a conventional audio cassette tape. This would permit the camera and recording circuitry to be incorporated into a single easily portable camera body, and would significantly enhance the versatility of such a system.

Further, even if a signal processing system is designed which will enable recording of the data on a smaller recording area, it is also a problem that conventional audio cassette tapes have difficulty handling high data recording speeds, and it would therefore be desirable to provide a video signal processing system which would enable the recording of the video data at a much reduced rate. This would enable the use of conventional audio cassette tapes which are readily available and inexpensive.

SUMMARY OF THE INVENTION

It is therefore an object of the present invention to provide an improved technique for compressing the bandwidth of video signals.

It is further object of this invention to provide such a technique which substantially compresses the data to allow the data to be recorded on a conventional audio cassette, while preserving adequate image integrity.

Briefly, these and other objects are achieved by a system wnherein the digital video data is received and converted via a well-known Hadamard transform into a series of Hadamard coefficients. The coefficients corresponding to piture elements (pixels) on successive lines of the image are compared with one another, and the coefficients need not be sent if there are no changes in any particular group of coefficients. If there are changed coefficient values detected, the new coefficient values are sent via an entropy coding technique (a Huffman code in the example described in this application), which provides a still further degree of compression. In one example, a four-level Huffman code is used, and only the first code value is sent if there are no changes detected. If there are only a few changes detected, the second Huffman code value can be sent together with the changed coefficient values, each preceded by a binary number designating the position of the changed coefficient in the series of coefficients currently being sent. If a moderate number of coeffecent changes are detected, the third Huffman code value can be sent, followed by an n-bit word having 1's and 0's at its various positions indicating which of the coefficient values are to be changed, and this n-bit word can be then followed by the new coefficient values. Finally, if a large number of changes are detected, the fourth code value is sent followed by the entire group of coefficients.

The data to be transmitted is packed by removing all superfluous bits, and the packed but erratic information bits are then provided through a smoothing buffer to achieve a substantially smooth data flow rate at a much lower bit rate than the information originally provided from the image detection device. The smoothed data is then provided to conventional processing circuitry for recording.

In a second example, only two Huffman code levels are used, one designating no changes and the other designating up to a predetermined number of changes, with any changes after the predetermined number being ignored. In addition, a dirty bit generator can be used to force the sending of each coefficient value at least once per frame.

The playback unit performs substantially the reverse operation of the recording unit. The data from the frame memory is provided to an unpacker on a demand basis, with the unpacker determining the order and bit length of the various information signals in the data stream. The information is passed through a decoder and Hadamard transformer to achieve the original digital data which is then converted in a well known manner to an analog NTSC signal for display on the television.

BRIEF DESCRIPTION OF THE DRAWINGS

The invention will be more clearly understood from the following description in conjunction with the accompanying drawings, in which:

FIG. 2 illustrates the calculation steps in the Cooley-Tuckey algorithm used for Hadamard transform calculation;

FIG. 4 is a block diagram illustrating the Hadamard transform calculation stage for use in a color signal processing system;

FIG. 5A is block diagram of the line compare, $C_x$ generator, Huffman coding and packing stages of FIG. 1;

FIG. 5B is a conceptual illustration of the operation of the multiplexer 240 in FIG. 5;

FIG. 6 is a diagram for explaining the operation of the packing circuitry in FIG. 5.

FIG. 7 is a block diagram of the smoothing stage of FIG. 1;

FIG. 10 is a state diagram for explaining the operation of the circuitry of FIGS. 9A-9D;

FIGS. 11A and 11B are illustrations for explaining the operation of the T-bit PROM 242 in FIG. 5A;

FIG. 12 is an overall block diagram of the image recording portion of the system according to the present invention.

DETAILED DESCRIPTION OF THE PREFERRED EMBODIMENTS

Figure 1:
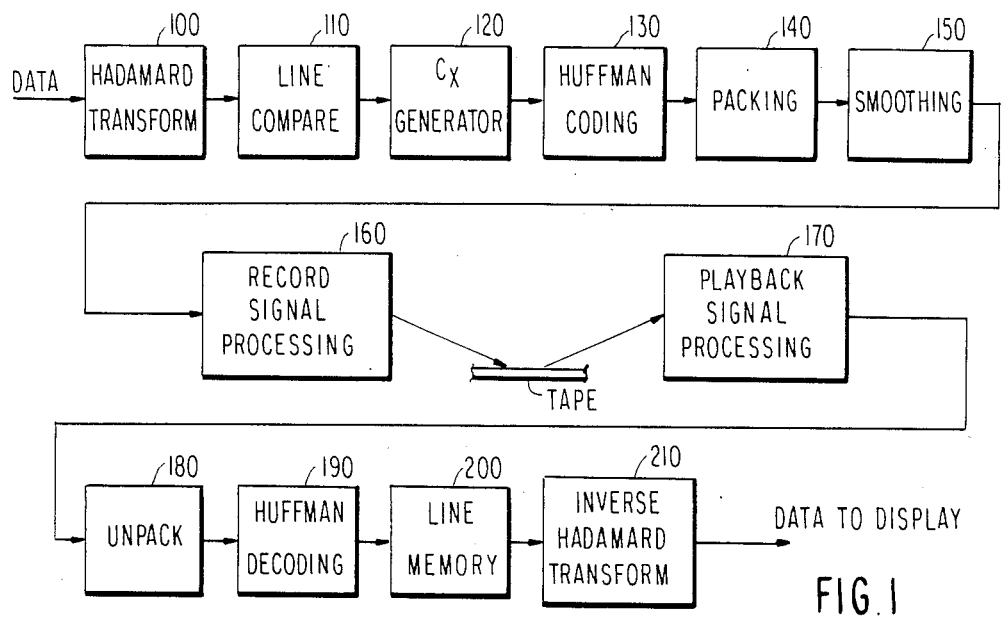
FIG. 1 is a block diagram of the overall video signal processing system according to the present invention.

The present invention seeks to provide a digital compression technique for reducing the very large bandwidth of a linearly digitized raster scan television video signal. In general, digital compression seeks to represent large numbers of bits of information by small codes by taking advantage of inherent redundancy in the original information. The goal of compression is to remove all redundancy from the original signal in order to achieve maximum compression and resulting minimum bandwidth.

The processing technique of the present invention employs five basic elements of digital compression: (1) taking the first differential of the digital signal, (2) log DPCM coding, (3) "fuzz," (4) taking the second differential (or possibly higher differentials), and (5) run length coding of the resultant signal using a partial Huffman code technique. The resulting algorithm will compress any linear or nearly linear portion of the video signal. In addition, curves will be slightly compressed due to the effects of the second derivative and fuzz. The basic elements listed above can be briefly explained as follows.

Logarithmic Differential Pulse Code Modulation (LOG DPCM)—differential pulse code modulation is simply the generation of point-by-point discrete difference values. This is analogous to the first derivative of the PCM signal. LOG DPCM is a modulation technique that encodes the differences to a log using fewer bits. This yields low accuracy on large changes and high accuracy on small changes, which matches the properties of human vision. After a large change, the resultant amplitude will typically be incorrect, so that several small changes must follow in order to produce the correct amplitude. This makes a LOG DPCM encoder somewhat different than a straight DPCM encoder.

Fuzz—fuzz refers to a window or band inside which the values may deviate from a norm and still be considered exactly equal to that norm. Fuzz inside of a compression coding scheme allows the rejection of low amplitude noise and low amplitude spatially high frequencies that will each seriously deteriorate the compressibility of a signal by contributing undue entropy.

First and second differentials are merely derivatives of the signal and need not be further explained.

The compression technique of this invention is run-length compression, whereby runs of identical values will be coded with a single code value. The first derivative of a signal results in runs of identical values being equal, since a string of constant values will have a slope of zero. However, in television signals, gradually changing light levels cause straight line runs of other than zero slope. These straight line runs of other than zero slope can be reduced to runs of zero by taking the second derivative of the signal.

A basic element, then, of the present invention is the process of using the second derivative to increase the compressibility of the video signal. See, for example, Amilk K. Jain, IMAGE DATA COMPRESSION: A REVIEW, Proceedings of the IEEE, Vol. 69, No. 3, March 1981. In the present invention, however, the compression technique is simplified by operating in the transform domain rather than the time domain, as will be described in more detail below.

FIG. 1 is a simple block diagram of a portion of the system according to the present invention, and the operation of the system of FIG. 1 will be first described in the context of only 16 pixels of image data.

Also, while the invention is contemplated for use in a color video recording system, the concept of the invention can first be more easily explained with reference to a black and white system, with the more complicated color signal processing system being described later.

The first step in the data compression system according to the present invention is to take the Hadamard transform of the image data. Hadamard transformation is a known technique for use in compresssing video data, but will be briefly explained in the context of video signal processing of 16 pixels of data represented by six bits per pixel.

In Hadamard transformation, a matrix of operators, each of which is +1 or −1, is multiplied by all points in the data to be transformed to thereby obtain a series of coefficients. The basic Hadamard transformation matrix is

| | |
|---|---|
| +1 | +1 |
| +1 | −1 | where it is noted that a characteristic of the matrix is that the lower right-hand quadrant is inverted with respect to the remaining three quadrants. Considering for the sake of simplicity the case of 4 data points A, B, C and D to be transformed, the basic Hadamard matrix would be expanded into a 4×4 matrix of operators by repeating the basic matrix four times, with the matrix being inverted in the lower right-hand quadrant of the 4×4 matrix. The resulting matrix of operators would be

| | | | |
|---|---|---|---|
| +1 | +1 | +1 | +1 |
| +1 | −1 | +1 | −1 |

-continued

| | | | |
|---|---|---|---|
| +1 | +1 | −1 | −1 |
| +1 | −1 | −1 | +1 | which would be multiplied by the four data points A, B, C, D with each point being multiplied by a respective coefficient in each row and the multiplication results summed to obtain a coefficient. For example, for data points A, B, C and D and the 4×4 Hadamard matrix shown above, the first row would yield a first Hadamard coefficient $HC_1=(A+B+C+D)$, the second row would yield a second coefficient $HC_2=(A-B+C-D)$, the third would yield a third coefficient $HC_3=(A+B-C-D)$, and the fourth row would yield a fourth coefficient $HC_4=(A-B-C+D)$.

If a Hadamard transformation is to be performed on 16 data points at one time, a 16×16 transformation matrix would be used. Both upper quadrants and the lower left quadrant of the 16×16 matrix would each correspond to the 4×4 matrix shown above, with the lower right quadrant of the 16×16 matrix corresponding to the 4×4 matrix with the signs reversed.

A known algorithm for calculating a Hadamard transform is the Cooley-Tuckey algorithm which is schematically shown in FIG. 2 for a 16-point transformation. FIG. 2 illustrates six stages, with only the first four stages 10, 20, 30 and 40 performing the transformation calculations. In FIG. 2, a solid line from one memory location to another represents addition, while a dotted line indicates subtraction. Thus, values $A_0$ and $A_1$ are added to obtain $B_0$, while $A_0-A_1$ is calculated to obtain $B_8$. The numbers in the upper left-hand portion of each box represent the timing at which the various values are obtained, with the assumed timing sequence being given by 0, 1, 2, ... 14, 15, 0', 1', 2', ..., 14', 15', 0'', 1'', 2'', ... 14'', 15'', etc. Thus, the value $A_0$ is provided at time $t_0$ and the value $A_1$ is provided at time $t_1$. At time $t_2$, the value $B_0=(A_0+A_1)$ is calculated and provided to the second stage while the value $A_2$ is being provided to the first stage. At time $t_3$, the value $B_8=(A_0-A_1)$ is calculated and provided to the second stage while the value $A_3$ is being provided to the first stage. At $t_4$, the value $B_1=(A_2+A_3)$ is calculated and provided to the second stage while the value $A_4$ is being provided to the first stage. At $t_5$, the value $C_0$ is calculated and provided to the third stage, the value $B_9$ is calculated and provided to the second stage, and the value $A_5$ is loaded into the first stage, etc. After 35 clock cycles, all of the calculated values are available in the fifth stage 50 of FIG. 2. The final stage 60 is used for rounding the calculated coefficients, as will be discussed in more detail below.

Figure 3:
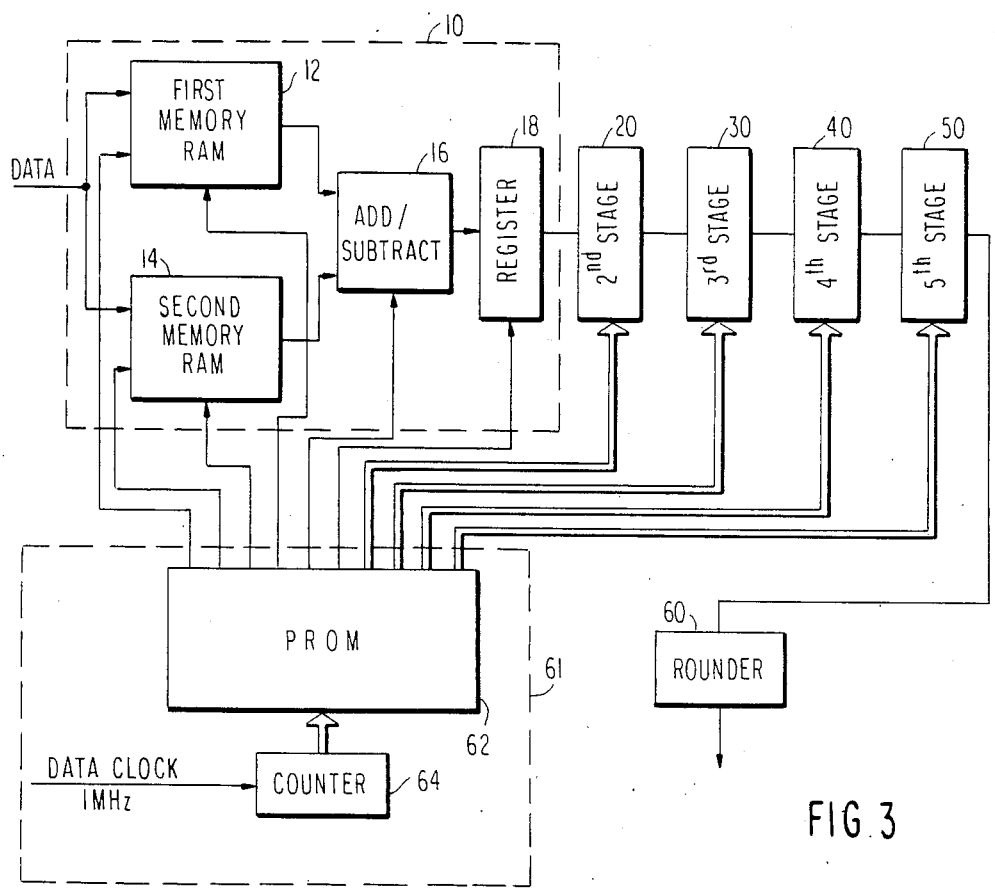
FIG. 3 is a block diagram of one example of a Hadamard transform calculation stage for use in the present invention.

The algorithm schematically illustrated in FIG. 2 could be calculated, e.g. by utilizing as the Hadamard transform circuitry 100 of FIG. 1 a calculation arrangement as shown in FIG. 3. The transform circuitry could include four stages, 10, 20, 30 and 40 each having a construction similar to that illustrated in detail for the first stage 10 in FIG. 3. These stages would perform the storage and calculation operations previously described in connection with FIG. 2. The fifth stage 50 could merely consist of an appropriate storage device such as a random access memory, since the fifth stage is not required to perform any calculations but merely stores the calculated coefficients which are provided at the output of the fourth stage, all as is illustrated in FIG. 2.

In operation, at time $t_0$, the value $A_0$ would be written into the first RAM 12, while at time $t_1$ the value $A_1$ would be written into the second RAM 14. During the clock period $t_2$, the values $A_0$ and $A_1$ would be read out of the first and second memories 12 and 14, respectively, added in the add/subtract circuit 16 and the resulting value $B_0$ stored in the register 18. Also during the clock period $t_2$, the vaue $A_2$ would be written into the first RAM 12. The reading and writing operations of the RAMS 12 and 14, as well as other memories throughout the system to be hereinafter described, are controlled in a well-known manner such that the read operation is performed during the first half of a clock cycle and the write operation is performed during the second half of a clock cycle. The addresses provided to the memories 12 and 14, the read/write controls to those memories, the add/subtract control of the circuit 16 and the latching function of the register 18 may all be controlled by appropriate outputs from a controller 60 which may include a mapping programmable read only memory (PROM) 62 addressed in a well-known manner by the output of a counter 64. The counter 64 would be clocked at the pixel rate, e.g. 1 MHz.

The circuitry of FIG. 3 continues to follow the sequence of operations shown schematically in FIG. 2, with the first Hadamard coefficient being available at time $t_3'$ when the coefficient $E_0$ is calculated. The calculation continues until time $t_2''$ when the 16th coefficient $E_{15}$ is generated. Thus, for every 16 pixels, 16 coefficients are generated, and the coefficients are calculated for 16 pixels at a time for one entire line. With 256 pixels per line, 16 transforms would be calculated, with each transform including 16 coefficients.

A characteristic of a Hadamard transform is that it has a very large DC term with nearly all of the information being compressed into the first few coefficients. The power of the spectral density is concentrated at the origin, and this results in a substantial number of zeros in the later coefficients. This enhances the effectiveness of the line comparison 110 in FIG. 1 wherein each Hadamard coefficient of a particular line is, compared with the vertically aligned coefficient from the previous line. For example, after all Hadamard coefficients for line i have been calculated, the 16 Hadamard coefficients for the first 16 pixels of the next line i+1 are calculated. (It should be emphasized that, although each group of 16 coefficients corresponds to a group of 16 pixels, no one coefficient corresponds to a particular pixel.) These 16 coefficients for the first 16 pixels of line i+1 are then compared with the 16 coefficients corresponding to the first 16 pixels of line i. (It is assumed for the purposes of this description that the scanning of the image sensor elements is not performed in an interlaced field manner, but that all lines are scanned consecutively. If interlaced scanning is used, it may be preferable to perform comparison between coefficients in successive field lines so as to minimize the storage requirements of the system.) Since the coefficients being compared are located immediately above one another in the same region of the picture, there is a reasonable possibility that the 16 pixels will be substantially the same. Further, since the Hadamard transform has compressed most of the information into the first few coefficients, the later coefficients are largely zeros and the likelihood of coincidence of the coefficients is greatly enhanced. It will then be possible to represent all of the information in the form of signals indicating only the differences between coefficients on successive lines.

The $C_x$ generator 120 in FIG. 1 receives the output from the line comparison circuit 110 indicating the number of coefficients in each group of coefficients on a line which are different from corresponding coefficients from the previous line. In the example described herein, it will be assumed that the line comparison circuitry 110 compares groups of 16 coefficients at a time, and the complexity register $C_x$ will indicate a range of differing coefficients. For example, if foufr-level Huffman coding is to be employed, $C_x=0$ may indicate coincidence of all 16 coefficients, $C_x=1$ may indicate between 1 and 3 differing coefficient values, $C_x=2$ may indicate between 4 and 10 differing coefficient values, and $C_x=3$ may indicate between 10 and 16 different coefficient values. The appropriate complexity register value $C_x$ will be forwarded to the entropy coding stage, which in the described embodiment will be a Huffman encoder 130, where the new coefficient values will be encoded in a manner to be described in more detail below.

The output of the Huffman coding stage 130 will include a substantial number of superfluous bits. This can be easily appreciated by considering that the information from the image sensor which was orginally represented by a certain number of bits has been compressed by a factor approaching 4:1. Since the compression is all performed in real time, there will obviously be a substantial quantity of meaningless bits between the compressed data. In the packing circuitry 140, the superfluous bits are removed and the data is consolidated into words of a predetermined number of bits, e.g. 8 bits. This is also performed on a real-time basis and the 8 bit words will therefore occur at a somewhat erratic rate with substantial quantities of time between words. The smoothing circuitry 150 will smooth the data by reading the 8-bit wrds into a buffer at their erratic rate and then reading them out of the memory at some constant rate. The rate at which the data is provided at the output of the smoothing circuitry should be selected to be sufficient to accommodate the "worst case", i.e. a situation in which the video image is rapidly changing so that the coefficient values will be more likely to change and the degree of compression achieved will be substantially reduced.

The operation of the $C_x$ generator 120 will now be briefly explained. As described above, the Hadamard transform generator 100 provides 16 coefficients for every 16 pixels. Since a property of the transform is that it compresses most of the information into the first few coefficients, the early coefficients may be represented by a greater number of bits while the less significant later coefficients may be represented by a lesser number of bits. An example of the bit allocation for Hadamard coefficients $HC_0$ through $HC_{15}$ may be: $HC_0$–$HC_2$, 8 bits; $HC_3$–$HC_5$, 7 bits; $HC_6$–$HC_7$, 5 bits; and $HC_9$–$HC_{15}$, 4 bits.

Line comparator 110 compares, in groups of 16, the coefficients from one line with the corresponding coefficients of a previous line, and a sequence of 16 coincidence and non-coincidence indications is supplied to the $C_x$ generator 120. The $C_x$ generator may operate according to a desired set of coding rules, and generates a complexity register $C_x$ which classifies the group of 16 coefficients according to the number of differences detected. The above example of allocations represented by the values $C_x=1$ through $C_x=3$ will be assumed for the purposes of this example, but other schemes may be used depending on the need for simplicity or accuracy.

In the Huffman coder 130, both the complexity register $C_x$ and Hadamard coefficients are received. The coder 130 then generates an encoded signals which represents the differences in the new 16-coefficient transform. First, the coder 130 generates a Huffman code which is a series of bits always distinguishable even in a continuous bit stream. For example, the codes may be 0, 10, 110 and 111 for $C_x$ values of 0, 1, 2 and 3, respectively. The coder 130 then follows the unique Huffman code, when appropriate, with data as to the position of the coefficient which differs and the value of the new coefficient.

For example, for $C_x=0$, no new coefficient values have been detected and no coefficient values need be sent. Only the single "0" designation need be transmitted. Since the original 16 pixels included 96 bits, a condition of $C_x=0$ results in a compression factor of 96:1.

For $C_x=1$, the Huffman code 10 is followed by data of the form LLLLCCCCCCCCT, where LLLL indicates a 4-bit code representing the location (i.e. 0–15) of the coefficient which is different and CCCCCCCC is the value of the different coefficient and will comprise anywhere from 4 to 8 bits depending on the particular coefficient which differs. The value of the termination bit T will indicate whether a particular coefficient value is the last coefficient value being transmitted, with a value T=1 indicating that it is the last changed value and a value of T=0 indicating that more coefficient values are to follow. For example, if there is only one changed coefficient value, the termination bit T will have a value of 1. If there are two or three changed coefficient values, the termination bit T after the first one or two coefficient values will be 0 to indicate that a further LLLLCCCC sequence is to be included with this code, and a T value of 1 will be included with the last of the changes. For a transform having new coefficient values for the coefficients $HC_0$, $HC_5$ and $HC_7$, the complexity register will have a value of $C_x=1$ and the output of the Huffman coder 130 will be of the form 10 0000CCCCCCCC0 0101CCCCCCCC0 0111CCCCC1.

Since the amount of resulting information for $C_x=1$ may range from 11 bits (one 4-bit coefficient change) to 41 bits (three 8-bit coefficient changes), the compression factor achieved is between 8.72:1 and 2.34:1.

It is to be noted that the position code LLLL will identify the position of the coefficient which differs, and this will also positively indicate how many of the next bits represent the coefficient value.

For $C_x=2$, there are between 4 and 10 new coefficient values, and the Huffman code 110 will have to be followed by position and value data for as many as 8 different coefficients. Rather than indicate the position of each new coefficient by a separate 4-bit LLLL code as above, which may require up to 32 bits of position data, a single 16-bit position word can be sent with a 0 in any position indicating that no new coefficient is being sent for that position and a 1 in any position indicating that a new coefficient value is being sent. The new coefficient values can then be sent in the order of occurrence. If the system uses 8-bit signalling, the information may preferably be arranged such that the Huffman code 110 is followed by a first 8-bit word indicating which of the first 8 coefficients are being sent, followed by the new values of those of the first 8 coefficients which have changed, then followed by a second 8-bit word indicating which of the second 8 coefficients have been changed, and finally the new values of those of the second 8 coefficients. For $C_x=2$, the compression factor ranges from 2.74:1 (four 4-bit coefficient changes with 35 total bits) to 1.23:1 (the 9 largest coefficient changes with 78 total bits).

For $C_x=3$ indicating 10 or more changes, it is simplest to send the 3-bit Huffman code 111 followed by the entire 87-bit Hadamard transform, resulting in a compression factor of only 1.1:1.

After generating the appropriate Huffman code and change information, packing is necessary. This is due to the fixed word size (e.g. 8 bits) employed. For example, for $C_x=11$, the Huffman code 10 is followed by at least one four-bit location word, coefficient value and termination bit. However, if 8-bit signalling is used, the information may occur in the form 011XXXXX LLLLXXXX CCCCCCCC TXXXXXXX, where "X" indicates a meaningless bit.

These meaningless bits can be removed by packing to obtain further compression. This can be accomplished in a number of different ways, one of which will be explained in the specific example below. After the data is packed, however, the packed data may occur at an erratic rate due to the variable number of bits removed from different portions of the signal. The data rate can be smoothed in the smoothing circuit 150, for example, by storing the data in a buffer memory and then reading it out at a predetermined rate. It should be noted that, with the calculations performed on a real-time basis, there is no time compression which occurs up until the smoothing circuit 150. Thus, for example, even when a single "0" is sent in place of 16 pixels, the 0 will occupy the same time as the original 96 bits and the single "0" would therefore occupy the same area on a continuously running magnetic tape. An essential aspect of the invention, therefore, is the reading out of the data from the smoothing circuit at a predetermined constant rate, and driving the recording tape at a corresponding constant slow rate, with the rate being chosen so that the information being read out of the smoothing circuit will always be faster than the video information generated at the input to the Hadamard transform circuit 100.

As can be seen from the above description, the scheme according the present invention does not discard any of the information. This is an advantage over conventional compression schemes which typically achieve their compression at a trade-off of image integrity. However, if it is decided that some image degradation is acceptable, additional compression and considerable simplification of the system may be achieved in a number of ways. For example, the Huffman coding rules may be modified by eliminating $C_x=3$ from the process. Whenever more than 10 changes occur, the first 10 of the new coefficient values may be sent using $C_x=2$. This would have little, if any, visible effect on image quality. If some noticeable degradation is permitted, further compression and simplification can be achieved by using only $C_x=0$ and $C_x=1$.

The smoothed data at the output of smoothing circuitry 150 is provided to conventional recording signal processing circuitry 160 for recording on tape. At a subsequent time, the recorded information can be reproduced by conventional playback circuitry 170 and the reproduced information can be provided to an unpacking circuit 180 which will perform substantially the reverse operation of the packing circuitry 140. No "unsmoothing" circuity will be required, since the unpacking circuitry operates on a demand basis. The unpacked data is provided through the Huffman decoding circuitry 190 where the individual new coefficient values are detected and their positions determined, and these new coefficient values are then stored at an appropriate location in a line memory 200 which will thereby maintain updated values for a complete line of image. The coefficients can then be read out of the line memory 200 to an inverse Hadamard transformation circuit 210 which will then regenerate the original data, and the digital data signals can then be provided to conventional display circuitry for generation of a suitable display signal, e.g. an analog NTSC signal for display on a conventional television set.

The above system has so far been generally described in the context of a black and white signalling system, but the preferred embodiment of the invention will be employed with a color signalling system. The above system will therefore have to be modified to accommodate processing of both luminance and chrominance information, and such a modified system will now be described in detail as the preferred embodiment of the invention.

Turning now to FIG. 4, the geometry of a solid state image sensor, as is well known in the art, requires that the sampling frequency of the chrominance signal be only half that of the luminance signal. The 4-bit B-Y chrominance samples occuring at a rate $f_s/2$ could then be provided as one input to the multiplexer 102, and the 4-bit R-Y chrominance samples could be provided as a second input to the multiplexer 102. These samples would each occur at one-half the pixel rate, and the multiplexer 102 would be clocked at the pixel rate, e.g. 1 MHz. Designating the B-Y chrominance samples as $c_1$ and the R-Y chrominance samples as $c_2$, the output of the multiplexer 102 would then be in the form $c_1c_2c_1c_2c_1c_2 \ldots c_1c_2$.

The multiplexed chrominance samples would then be provided to a Hadamard transform circuit of the type shown in FIG. 3. The 6-bit Y luminance samples occurring at a 1 MHz rate would similarly be provided to a second Hadamard transform circuit 106 which would also have a configuration such as illustrated in FIG. 3. For every 16 luminance samples, there would be 16 coefficients generated at the output of circuit 106 and there would also be 16 chrominance coefficients generated at the output of transform circuit 104. These would then be interleaved at the output of multiplexer 108 to obtain a group of 32 interleaved luminance and chrominance samples occurring at a 2 MHz rate.

With each addition in a particular stage of the Hadamard transform circuits 104 and 106, the number of bits must be increased by 1 in order to avoid loss of information. Since there are 4 additions performed in each of the transform circuits, the coefficients provided at the output of transform circuit 104 would have to include 9 bits (8 bits plus a sign bit) and the coefficients at the output of transform circuit 106 would have to include 11 bits (10 bits plus a sign bit). In actuality, the outputs from each of the transform processors will be 12 bits, but the excess bits are meaningless and are all zeros, i.e. 12-bit adders are used in the transform processors but not all 12 bits are required in the successive additions. The multiplexed coefficients are then all rounded off in a rounder 60 by adding a value of 0.5 to each coefficient and then selecting the desired most significant bits. For example, to obtain a desired 8 bits for each coefficient, a value of "1" can be added to the ninth bit position and then the ninth through twelfth bit positions can be dropped. The effect is the same as rounding off to the nearest 8-bit value.

To compare coefficients on successive lines, it is necessary to compare the 32 coefficients on one line with the 32 coefficients corresponding to vertically aligned pixels on the previous line. This is accomplished by a line comparison circuit 110 which may be configured in a manner illustrated in detail in FIG. 5A. The coefficients provided at the output of rounder 60 are provided in common to the registers 202 and 204 as well as to the single transform memory 206, the latter memory having a storage capacity sufficient to store all of the coefficients (e.g. 32 coefficients) in a single transform. During the first half of a clock cycle, the coefficient $X_{ij}$ is provided from the register 202 to the comparator 208 and the corresponding coefficient $X_{i-1,j}$ from the previous line $i-1$ is read from the memory 209 to the comparator 208. The line memory 209 operates substantially as a shift register and has a capacity sufficient to store the coeffients for one entire line of image, e.g. 512 coeffients for a line of 256 pixels. The address provided to the line memory 209 is derived from a counter 212 which is clocked at a 2 MHz rate corresponding to the rate at which the coefficients are provided from the rounder 60. The line 211 is a conventional tri-state bus, and the memory 209 as well as other memories and registers in FIG. 5A are controlled by a mapping PROM controller 214 of a type well known in the art.

The same reading and writing process is employed in FIG. 5A as is employed throughout the remainder of the system, i.e. with the memory being read during a first half of the clock cycle and written into during a second half of the clock cycle. Thus, after the first half of a clock cycle when the coefficient $X_{i,j}$ from the register 202 and the coefficient $X_{i-1,j}$ from the line memory 209 are compared in the comparator 208, the coefficient $X_{i,j}$ from the register 204 is written into the line memory 209 while the address provided to the line memory 209 remains unchanged. At the same time, the new coefficient value $X_{i,j}$ is also written into the single transform memory 206 in a manner to be described in more detail below.

In this way, as the $X_{ij}$'s are successively provided at the output of rounder 60, they are continually compared with the corresponding coefficient $X_{i-1,j}$ from the previous line. If a difference is detected in the comparator 208, a "1" is generated at the output of comparator 208. The "1" signals are then counted in the $\Delta$ counter 216, and the output of the counter 216 addresses a $C_x$ PROM 218 to generate the complexity register $C_x$ according to the desired algorithm as discussed above.

The "1" and "0" outputs from the comparator 208 are also provided to a shift register 220 which may be a 32-bit shift register for storing a pattern of 1's and 0's indicating which coefficients are to be changed. Assuming that the system is designed for 8-bit signalling, the oldest 8 bits in the register 220 can be provided as a parallel output when required by the controller 214.

Coefficient counter 222 is a 5-bit counter (or any n-bit counter using the sixth bit as a clear input) so that it will have a 32-count cycle. This counter 222 will be clocked by the same 2 MHz clock as the counter 212, and it will count the number of coefficients in each transform. The carry-over output from the counter 222, which occurs at the end of each 32-coefficient transform, is provided on line 224 as a load signal to the down counter 226 which at that time stores the value in the $\Delta$ counter 216 indicating the number of changed coefficients detected in the most recent 32-coefficient transform. At the same time, the carry-over output of the counter 222 is provided to the clear input terminal of the $\Delta$ counter 216 to prepare that counter for the next round of comparisons.

As described above, when a changed coefficient is detected in the comparator 208, a "1" output is generated. When the coefficients are the same, the output of comparator 208 is "0". These "1" or "0" outputs are not only provided to the $\Delta$ counter 216 but are also provided as an input to the single transform memory 206. Each time that a new coefficient is stored in the transform memory 206 during the second half of a clock cycle, a flag bit, hereinafter referred to as a $\Delta$ bit, is stored at the same memory location to indicate whether that stored coefficient value is the same as or different from the corresponding coefficient of the previous line.

The address input to the memory 206 is received from the output of coefficient counter 222. Thus, during the first half of a clock cycle, coefficient $X_{i,j}$ in a given transform is read out of the memory 206, and coefficient $X_{i,j+32}$ is then written into the same address of memory 206 during the second half of the clock cycle.

As previously described, the down counter 226 is loaded, at the end of a complete sequence of comparisons, with a number corresponding to the number of changed coefficients detected in that transform. As the transform coefficients are read out of the memory 206, the $\Delta$ bits are provided to the down counter 226 so that the value in counter 226 will become 0 when the last changed coefficient value is being read out of the memory 206. The counter 226 will at that time indicate on line 230 that the termination bit T should have a "1" value.

The purpose of the multiplexer 240 is to select the various signals in the appropriate order to obtain the desired bit sequence at the encoder output. For example, for $C_x=1$, the multiplexer could first select the Huffman code value from line 241, followed by a 5-bit location byte from line 242, a coefficient value from line 243, a termination bit value from line 230, a second location byte from line 242, etc. However, the selection of each signal separately in a fixed word length format (e.g., 8 bits) as described above would result in an excessive number of invalid bits at the output of the multiplexer 240. More importantly, it would require an excessive number of clock cycles. The invalid bits could be eliminated in the subsequent smoothing process, but the throughput would nevertheless be undesirably slow due to the relatively low number of valid bits per multiplexer clock cycle.

In order to improve the processing speed, certain frequently-occurring combinations of signals can be implemented, e.g. by hardwiring, prior to selection by the multiplexer 240. Thus, the multiplexer 240 as illustrated in FIG. 5A may operate not merely as a circuit for selecting one of the illustrated inputs, but instead as a map receiving 67 input bits and providing 8 output bits. Sixty-four of the input bits are derived from the Huffman code value on line 241 from the PROM 214, the 5-bit location byte on line 242 from the coefficient counter 222, (note that the location word is a 5-bit word, since there are 32 coefficients in each transform, as opposed to the 4-bit word described above in the context of the black and white signalling system), the coefficient value on line 243 from the memory 206, the location byte from shift register 220 which is provided 8 bits at a time on line 244, and the termination bit value from line 230. (In the preferred embodiment, the T bit value on line 230 is not acutally provided directly to the multiplexer but is provided in combination with other signals via the T-bit PROM map 247 and a pair of 8-bit registers $R_1$ and $R_2$, as will be described in more detail later.) The final three bits of address input to the map 240 are provided by the PROM 214 via line 248. The multiplexer 240 then effectively acts as a map or a decoder by passing one of 8 possible 8-bit combinations in accordance with the 3-bit signal on line 248.

The combination of selected bits from the various signals may preferably be implemented by hardwire connections at the multiplexer input, but the concept can be more easily understood by illustrating the multiplexer 240 as a hardwire combination circuit $240_1$ and an 8:1 multiplexer $240_2$ as shown in FIG. 5B. The hardwire combination circuit $240_1$ receives the signals on lines 241–246 and selects certain bits from appropriate signals to form eight-bit inputs 0–7 to the 8:1 multiplexer $240_2$. For example, the multiplexer input 0 may include the first two bits of the Huffman code from line 241, followed by the 5-bit location byte from line 242 and finally including the last bit from the 8-bit coefficient value on line 243. The input 1 to the multiplexer $240_2$ may include all three bits of the Huffman code from line 241 together with 5 bits from the 8-bit location byte on line 244. The input 2 may include the remaining three bits from the location byte on line 244 together with five invalid, or meaningless bits. Input 3 to the multiplexer $240_2$ may include the five bits of the location byte from line 242 together with three bits of the coefficient value from line 243. Inputs 4 and 5 are provided on lines 245 and 246, respectively, and will be described later. Input 6 may comprise all eight bits of the coefficient value from line 243. Finally, input 7 may comprise all eight bits of location information from line 244.

Referring again to inputs 4 and 5 to the multiplexer $240_2$, these inputs are provided over lines 245 and 246, respectively, from registers $R_1$ and $R_2$. The contents of registers $R_1$ and $R_2$ are provided by the T-bit PROM map 247, and the purpose of this arrangement is to form certain combinations of signals which will be needed for the case $C_x=1$. More particularly, with an unlimited number of inputs available to the multiplexer 240, it would be possible to hardwire all desired combinations of signals at different inputs to the multiplexer. However, given a limited number of inputs to the multiplexer 240, it is desirable to provide some means for dynamically changing the bit signal format for the various $C_x=1$ cases. This can be more easily understood with reference to FIGS. 11A and 11B.

FIG. 11A illustrates the multiplexer outputs for the case $C_x=1$ in which a single coefficient change is transmitted and the coefficient length is 8 bits. During a first multiplexer clock cycle, the multiplexer $240_2$ will select at its output the input designated by reference numeral 0, which input includes the 2-bit Huffman code 10, the 5-bit location byte LLLLL, and one bit of the coefficient value. The next output from the multiplexer $240_2$ will be the remaining seven bits of the coefficient value followed by the termination bit T. This latter 8-bit signal is provided from the register $R_2$ to the multiplexer 240. Thus, it is known that the first 8-bit output from the multiplexer 240 for the $C_x=1$ case will always be as shown at $t=0$ in FIG. 11A, i.e. two bits of Huffman code, five bits of location byte and one bit of the coefficient value. The second bit provided at the multiplexer output should always include the termination bit T, but the position of the termination bit T in that second byte will vary depending upon the length of the coefficient value being transmitted. If an 8-bit coefficient value is being transmitted, the position of the termination bit T will be as shown at $t=1$ in FIG. 11A. If the coefficient is less than 8 bits, the termination bit T will occur at a lower position in the $t=1$ byte. Accordingly, upon receiving the T-bit value on line 230, the new coefficient value on line 243 and the location byte on line 242, the T-bit PROM 247 will know the length of the coefficient and will therefore known the position at which the T-bit is to occur in the $t=1$ byte in FIG. 11A. The PROM 242 will then load into the register $R_2$ the coefficient value less the single coefficient value bit which is to be included in the $t=0$ byte of FIG. 12A, and the T-bit will be located at all of the remaining bit positions in the $t=1$ byte of FIG. 12A.

For $C_x=1$ cases in which more than one changed coefficient value is to be sent, the operation of the T-bit coefficient PROM 247 can be understood with reference to FIG. 11B. Once again, the first byte provided at the output of multiplexer 240 will be the input 0 to the multiplexer $240_2$ which includes the 2-bit Huffman code, the 5-bit location byte and one bit from the coefficient value. The second byte provided at time $t=2$ from the multiplexer 240 will be input 5A to the multiplexer $240_2$ provided from the register $R_2$, and will include the remaining $n-1$ bits of the coefficient value with the T-bit at the appropriate position. In FIG. 11B, the first coefficient value is an 8-bit coefficient, so that the $t=2$ byte includes seven coefficient bits with the T-bit at the eighth position.

The third byte provided at the output of multiplexer 240 for the $C_x=1$ case will always include the 5-bit location byte followed by three bits of the coefficient value as illustrated at $t=2$ in FIG. 11B. This byte will be selected from input 3 to the multiplexer $240_2$. The fourth byte will always be the remaining $n-3$ bits of the coefficient value followed by the T-bit at the appropriate position, as shown at time $t=3$ in FIG. 11B. This fourth byte will be provided from the register $R_1$ which will have been loaded by the PROM 247 in accordance with the known length of the second coefficient. Thus, for the $C_x=1$ case wherein first and second coefficient values of 8 and 6 bits, respectively, are to be sent, the multiplexer $240_2$ will provide at its output the four bytes shown in FIG. 11B by selecting, in order, its inputs 0, 5, 3 and 4. If a third coefficient value is to be sent, the inputs 3 and 4 to the multiplexer $240_2$ will be selected once more.

The operation of the above components will be made more clear from the following examples of $C_x=0$ through $C_x=3$. First, for $C_x=0$, the comparator 208 will have compared all 32 coefficients and found no changes. The new 32 coefficients will be stored in memory 206, and the valve in counter 216 will be 0. The control PROM 214 receives the output of $C_x$ PROM 218 and knows that $C_x=0$ and that the only information which must be sent is the Huffman code value 0. Thus, the PROM 214 will provide this Huffman code value 0 to the multiplexer 240 over line 241 while simultaneously sending a control signal to the multiplexer 240 over line 248 to cause the multiplexer to select its input 0. This Huffman code value of 0 will then be sent out of the multiplexer 240 of the shift register 250 and at the same time the PROM 214 will send a signal on line 252 to the register 254 indicating that only one bit of the 8-bit output from the multiplexer is considered a valid bit. This information is to be used for packing purposes as will be described in more detail below.

For $C_x=1$, the control PROM 214 knows that the only coefficient values which need be sent are those that have a Δ-bit value of "1". The PROM 214 receives the Δ-bit output from the memory 206 and, when a "1" is detected, the location count from the counter 222, coefficient value from memory 206, T-bit value from PROM 247 and Huffman code from PROM 214 can all be combined in the multiplexer 240 in the manner described above.

For $C_x=2$, the PROM 214 provides the Huffman code value 110 to the multiplexer 240 on line 241, and the shift register 220 provides the location byte on line 244 having a "1" at each position where the coefficient is to be changed. All coefficient values successively appear on line 243 from the memory 206, and the PROM 214 monitors the Δ-bit values and preferably controls the multiplexer 240 to select inputs 1, 2, 7 and 5 as many times as necessary to send those coefficient values which represent changes. The multiplexer actually need not select only those changed coefficient values, since this aspect of the selection could instead be accomplished in the packing step by sending a signal to register 254 indicating that there are no valid bits in the current multiplexer output.

For $C_x=3$, the Huffman code 111 is provided from the PROM 214 to the multiplexer 240 on line 241 together with a signal on line 252 indicating only 3 valid bits, and all coefficient values are then sent as they successively appear on line 243 by repeatedly selecting input 6 to the multiplexer $204_2$.

The packing step designated by reference numeral 140 in FIG. 1 will now be described. As discussed earlier, with fixed byte length signalling being used there will necessarily be meaningless bits included in the sequence of values provided at the output of the multiplexer 240. More particularly, for instance, for $C_x=0$, the multiplexer $240_2$ will first select its input 1. The multiplexer output will be 8 parallel bits, and these 8 bits will be loaded into the shaft register 250, but only the first bit is a meaningful or "valid" bit. The PROM 214 will at that time provide a four-bit signal 0001 to the register 254 indicating that only one of the 8 bits is valid.

The register 250 is preferably formed of two 8-bit registers and a pointer. The mapping PROM 256, which may simply comprise a modulo-8 adder, provides the "1" signal on line 252 to the register 254, which indicates to the shift register 250 that only the first bit in the output of the multiplexer at time $t_0$ is valid. The 8-bit multiplexer output at time $t_0$ will then be stored in the register 250 with a pointer indicating the next available bit position, as shown in FIG. 6. At the next clock period $t_1$, again assuming $C_x=0$, the process is repeated, except that the "1" signal on line 252 is added to the present pointer value in register 256, so that the register 256 now indicates at time $t_1$ that the first 2 bits in the register $250_1$ are valid. At time $t_2$, assuming now $C_x=1$, the input 0 to the multiplexer $240_2$ is provided at its output, with all eight bits being valid. The 8-bit output from the multiplexer is stored in the shift register 250 commencing at the third bit position indicated by the pointer, as shown at $t_2$ in FIG. 6, with the last two bits extending into the first two bit positions of the second register $250_2$. The "8" signal on line 252 indicating 8 valid bits is then added to the present pointer value modulo-8, whereby the adder overflows to a value of 2. In response to the overflow of the modulo-8 adder, the shift register 250 shifts the contents of the first register $250_1$ out to the smoothing circuitry 260, and shifts the contents of register 252 down to the corresponding location in the register $250_1$, with the net result being as shown at time $t_3$ in FIG. 6.

The next value selected by the multiplexer 240 will the input 5 provided from the register $R_1$, and this 8-bit output will be stored in the register 250 commencing at the third bit position of the first register $250_1$ as shown at $t_4$ in FIG. 6. Once again, the adder 256 will overflow to a value of 2, resulting in the shifting out of the first register contents and the shifting down of the second register contents, with the result being as shown at $t_5$ in FIG. 6.

The packing operation as illustrated in FIG. 6 will then continue until the image sensing device is turned off, at which time the register 250 can be read out regardless of the position of the pointer. Alternatively, the PROM controller may periodically, e.g. at the end of each line of coefficient values, cause the register 250 to be cleared. In the preferred embodiment, the register 250 is cleared evey block of lines, e.g., 8 lines.

The 8-bit parallel outputs from the packing register 250 will thus be provided at an erratic rate to the smoothing circuit 150 in FIG. 1, the operation of which can be easily understood from the following brief description in conjunction with the illustration of FIG. 7. The smoothing circuit 150 includes a buffer memory 260 which is alternately addressed by a write counter 262 and a read counter 264 through a multiplexer 266. Each time that an overflow occurs in the pointer counter of the register 250, a write signal is provided to the buffer memory 260 while simultaneously incrementing the write counter 262 and controlling the multiplexer 266 to select the output from the counter 262, thereby storing the 8-bit output from the register 250 at the next available memory location. The writing into the memory 260 may occur during the second half of a clock cycle as described above. Meanwhile, the reading from the memory 260 continues at a substantially constant rate determined by a clock signal (not shown) provided to the read counter 264. (The read-out rate should be fast enough to accommodate the "worst case" wherein the image is rapidly changing and many new coefficient values are being sent, and to protect against malfunction in the case of a still image where the writing rate into the memory 260 will be slow, the read and write address counters should be monitored to ensure that the read address does not overtake the write address. This type of buffering operation is well known and need not be described in further detail at this time.)

The system has been described above with reference to the use of a four-level Huffman code scheme having values $C_x=0$ through $C_x=3$. To simplify processing, a working system has been designed and built using only $C_x=0$ and $C_x=1$. For $C_x=0$, no changes are detected or sent, similar to the case for $C_x=0$ in the embodiment described above. In all other cases, the Huffman code value is $C_x=1$ and all changes are sent, in the same manner as described above for the case of $C_x=3$. Further, a limit on the number of changes per transform may be imposed if desired, e.g. a limit of no more than 15 new coefficient values per transform. In the vast majority of cases, this will be sufficient to accomodate all changes. In those cases where it is not, only the first 15 changes are sent. Since it is unlikely that only the same 15 coefficients will also be changed in the subsequent frame, the changes which were not taken care of in frame $i+1$ will be detected again and accommodated in frame $i+2$. This will result in a slight loss of information, but not enough to be visibly discernible on the eventual display.

The limit of 15 changes per transform may be accomplished by the simple technique of providing an output from the PROM 219 in FIG. 5A whenever the value in Δ-counter 216 reaches the limit value. The overload signal can be provided back to the comparison circuit 208 to disable the comparison circuit and freeze its output at a "0" level so that no more changes will be detected.

Because of the nature of the video information, including the concentration of the power of the spectral density in the first few coefficients of each Hadamard transform, it is possible that any given coefficient may go for an entire frame without being updated, and this may increase the possibility of error in the video image reproduction. It may therefore be preferable to include what will hereinafter be referred to as a "dirty bit generator" to insure that each coefficient is updated at least once per frame. This can be accomplished by forcing the sending of one coefficient per line, with the coefficient number being advanced at each line. In general, the dirty bit generator can merely indicate a changed coefficient value for one coefficient per line, and this indication can be OR'ed with the output of the line comparator 208 so that a particular coefficient in each line will be treated as a changed coefficient regardless of whether or not it has in fact changed. The dirty bit generator can be disabled when the maximum number of changes has occurred, similar to the disabling of the line comparator 208 in response to the overload signal from the $C_X$ PROM 218.

Figure 8A:
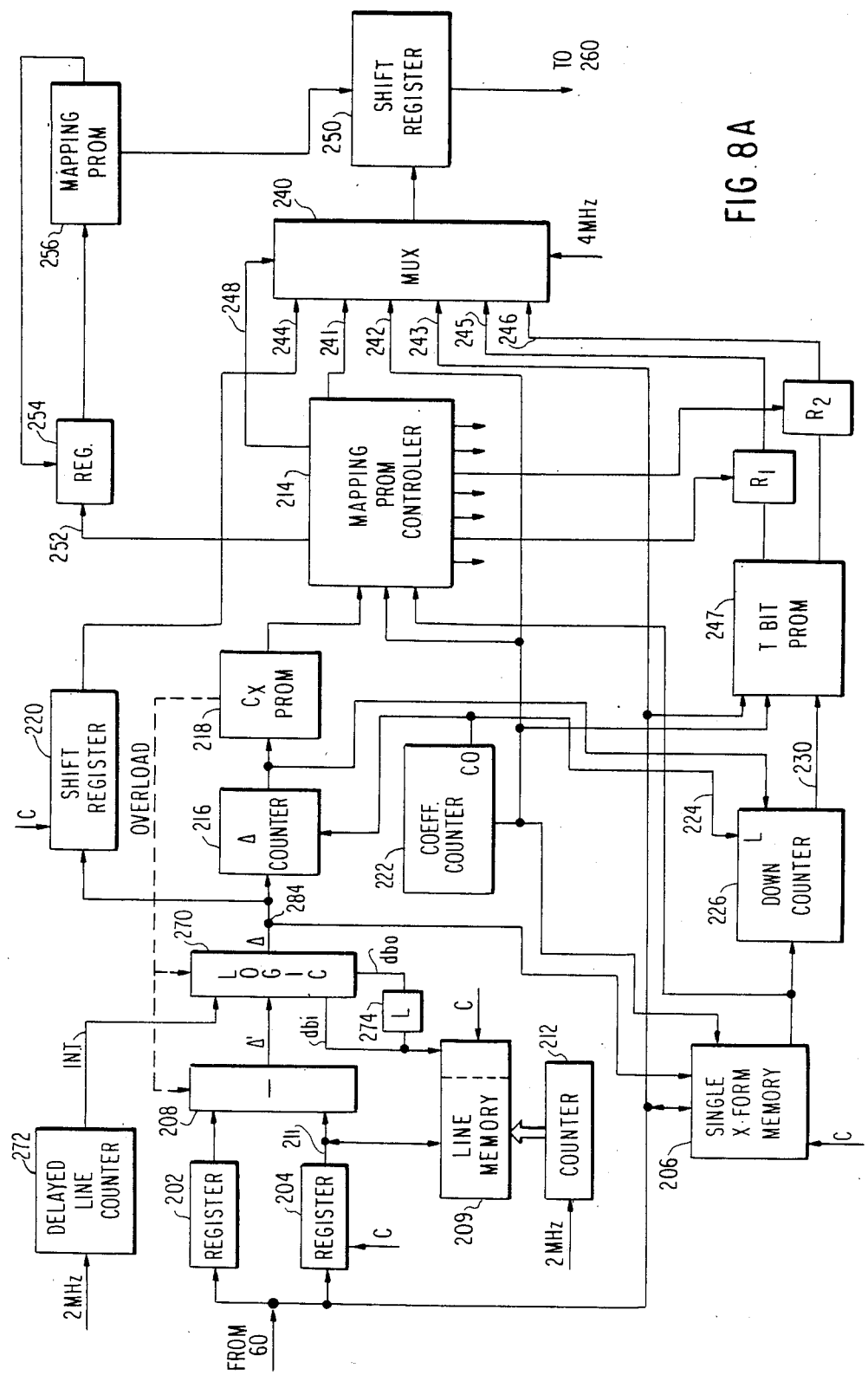
FIGS. 8A and 8B are diagrams of modified embodiment including a dirty bit generator, with FIG. 8B illustrating the dirty bit generator in more detail.
Figure 8B:
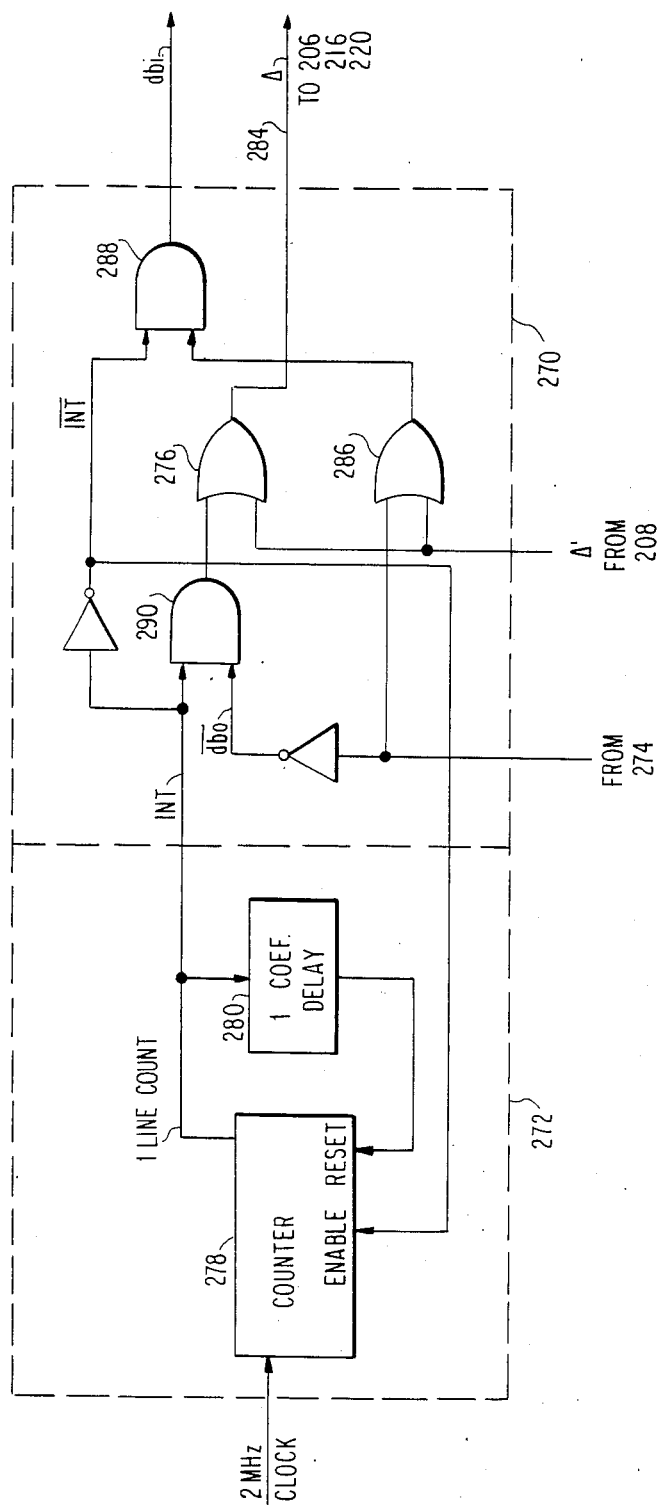

FIG. 8A illustrates the modifications to the system of FIG. 5A which are required to implement the dirty bit generator. Generally, the line comparator 208 may be supplemented with a combinational logic circuit 270, delayed line counter 272 and latch 274, and the line memory 209 may be expanded to include memory capacity for storing coefficient change detections for each line. The essential components of the combinational logic 270 and delayed line counter 272 are illustrated in more detail on FIG. 8B.

When a changed coefficient is detected, a signal $\Delta'$ is generated by the line comparator 208 and is passed through the combinational logic 270 via OR gate 276. The $\Delta$ indication from the output of gate 276 is provided to memory 206, counter 216 and shift register 220 in the same manner as in FIG. 5A. The counter 272 may preferably be implemented as a count-and-delay combination which counts one line and overflows, with the commencement of counting being delayed for one coefficient after each overflow. Thus, the counter 278 will provide an output INT once each line, e.g. at a count of 512 in a preferred embodiment of this invention, with the signal INT being also used to enable or disable the counter 278 in a known manner. The delay circuit 280 may be implemented simply as two-bit counter which is enabled by the INT output from counter 278 but which is disabled by its own full-count output, the counter 280 then being clocked by the 2 MHz signal to provide its output after a delay of one coefficient. Other implementations of the delay 280 are possible, e.g. a flip-flop, a monostable multivibrator having an appropriate pulse output duration and providing its output through an inverter to the enable terminal of counter 278, etc.

With the arrangement described and illustrated, the counter 272 will provide its output signal INT at a coefficient which is advanced by one position for each line. When the INT signal is generated, it could be OR'ed with the detected change bit $\Delta'$ and provided as the $\Delta$-bit output on line 284 from the combinational logic circuit 270. The corresponding coefficient value would then be sent just as if it had been detected as a changed coefficient. However, in view of the above-described purpose of the dirty bit generator, i.e. to insure that each coefficient is updated at least once per frame, it is unnecessary to send the "dirty bit" coefficient value if that coefficient value has been changed within the most recent frame. To this end, line memory 209 is expanded to include a portion dedicated to the storage of the changed coefficient detections. Each time a changed coefficient value is detected, a changed coefficient detection signal $db_i$ is stored in the memory 209. During the first half of each clock cycle, the $db_i$ value from memory 209 is read out to the latch 274. The value provided as an output from latch 274, hereinafter referred to as $db_0$ is then provided to combinal logic 270 where it is OR'ed in gate 286 with the current change bit output $\Delta'$ from the line comparator 208 to generate the signal $db_i$. Thus, once a coefficient has been sent its changed status will be continually indicated in memory 209'.

When the counter 272 is running and the dirty bit position for a particular line has not yet been reached, the signal INT has a low level, enabling AND gate 288 and disabling AND gate 290. Thus, the $db_i$ values will only indicate the coefficient values for which changes have actually been detected. When the INT signal is generated at the dirty bit coefficient for a given line, the $db_i$ input to memory 209 is forced to 0 by disabling gate 288. Thus, each coefficient position has its change bit forced to 0 at a frequency of approximately once per frame. If a particular bit position has not had a changed coefficient detection one frame later when the dirty bit indication for that coefficient again comes up, its value will be sent.

When the counter output INT is generated to indicate a "dirty bit" coefficient, the dirty bit coefficient need not be sent if the output $db_0$ from the latch 274 indicates the coefficient has been changed within the most recent frame. Accordingly, the INT signal is combined in an AND gate 290 with the inverse of $db_0$ before passing the INT signal through gate 276 as the $\Delta$-output from the combinational logic 270.

While the goal of the dirty bit generator is to ensure sending of each coefficient once per frame, it is noted that a frame may include 242 lines of 256 pixels each, thus resulting in 256 coefficients per line. If the delayed line counter 272 is implemented in the manner shown in FIG. 8B, each coefficient will be designated as a "dirty bit" coefficient at a frequency of once every 256 lines, which is slightly less than once per frame. However, this may be preferable to simplify the counting hardware.

The digital information stored on the recording medium will subsequently be read from the tape in a conventional manner and supplied from a frame store (not shown) in the playback signal processing circuitry 170 to the decompression portion of the system according to the present invention. The decompression operation will now be described with reference to the schematic drawings of FIGS. 9A-9D and the state diagram of FIG. 10.

Figure 9D:
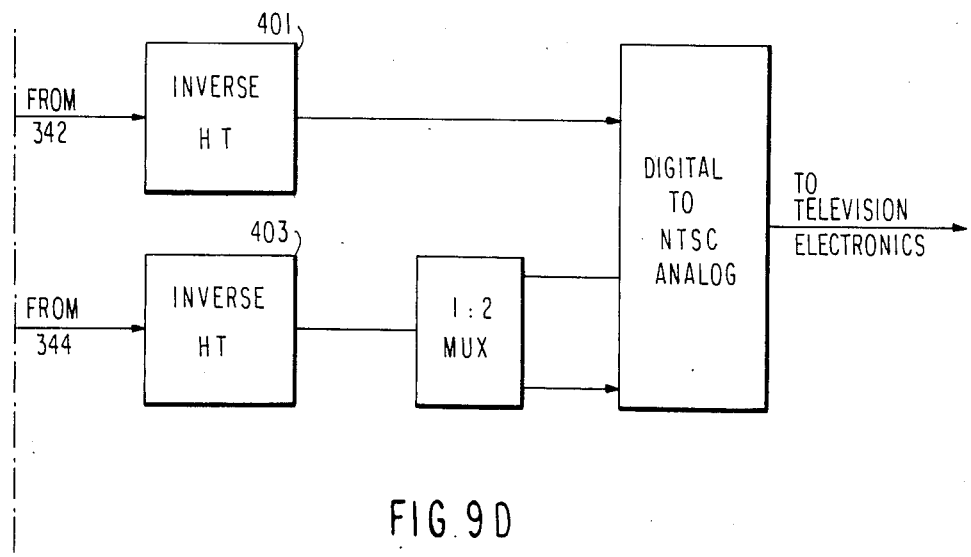
FIGS. 9A-9D collectively comprise a block diagram of the unpacking, Huffman decoding, line memory and inverse Hadamard transformation circuitry of FIG. 1.
Figure 9:
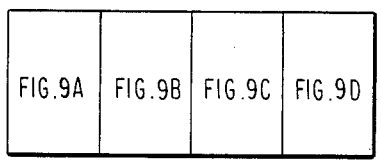
Figure 9A:
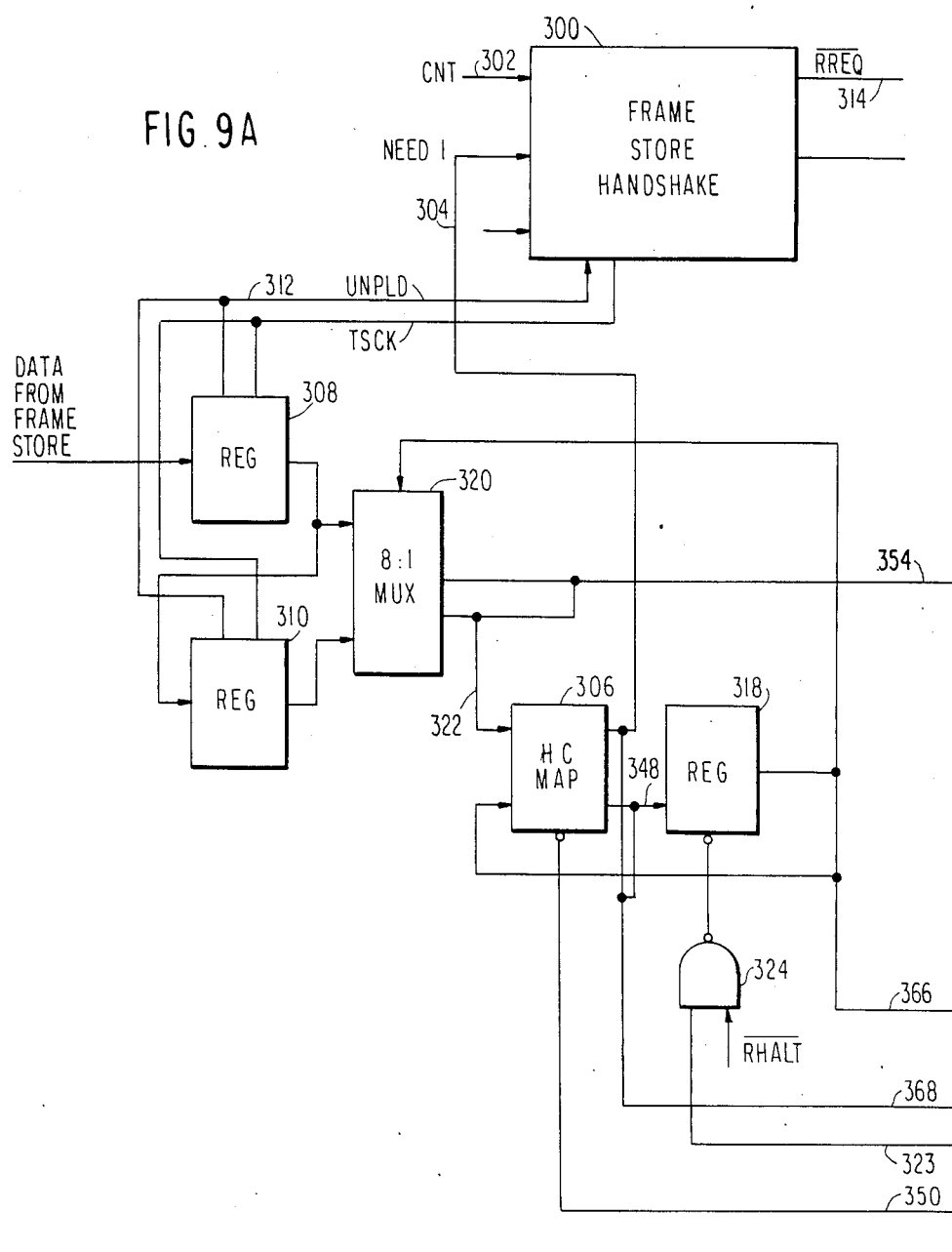

The unpacker is shown in more detail in FIG. 9A and includes frame store handshake control circuitry 300 for controlling the transfer of data from the frame store memory (not shown) to the unpacker. Upon receiving a block sync signal (NTSBS) indication on line 301 indicating the beginning of a block of coefficients, the system is initialized to the state 1 in the diagram of FIG. 10. The state counter and controller 316 in FIG. 9B will provide a "state 1" indication to the PROM map 362 via line 364, and PROM 362 will provide an output on line 368 one bit of which will be provided to handshake circuitry 300 via line 304 as a NEED 1 signal. Assuming the frame store has finished a read operation and that a byte of data is available in the frame store for transmission to the unpacker, a signal CNT will be provided from the frame store to the handshake circuitry 300 on the line 302. In response to the NEED 1 signal on line 304, the handshake circuitry will provide an unpacker load signal (UNPLD) on line 312. At the next clock signal TSCK, the contents of register 310 will be discarded, any contents from register 309 will be loaded into register 310, and register 308 will be loaded with the data currently provided at the output of the frame store. At the next clock cycle the counter and controller will advance to the state 2, or S2, and the map 362 will again provide the NEED 1 signal to handshake circuitry 300. The handshake circuitry will again control the registers 308 and 310 via lines 311 and 312 to discard the contents of register 310, load the contents of register 308 into register 310 and load the next byte from the frame store into the register 308. Having received two bytes of data, the handshake control 300 will generate a signal RREQ on line 314 indicating to the frame store that no further bytes are requested.

With both registers 308 and 310 now loaded, the state counter and controller 316 (FIG. 9B) will advance to state 3 in FIG. 10, at which time it is necessary to examine the first of the bits to determine the Huffman code. The controller 316 will provide a STATE 3 indication on line 364 to PROM 362 and will remove the $\overline{\text{STATE 3}}$ signal from line 350 to the Huffman code mapping PROM 306, disabling the output of the former and enabling the output of the latter. Initially, the pointer register 318 is at 0 and the 3-bit pointer value OLD PTR provided from the register 318 to the multiplexer 320, more commonly referred to as a "barrel shifter", has a 0 value. The multiplexer therefore provides at its output the first 8 bits beginning from the 0 bit position, which will be the first 8 bits of data received from the frame store. The two least significant bits of the multiplexer output will be provided on line 322 as a portion of the address to the Hadamard code mapping PROM 306, the remaining 3 bits of address to the PROM 306 being received from the output of the pointer register 318 to inform the PROM 306 where the pointer has already been set. The mapping PROM 306 then examines the two least significant bits received from the multiplexer 320, determines the value of the Huffman code, and generates an output signal representing a new pointer value.

The least significant bit (LSB) of the output from multiplexer 320 is also received by the state counter and controller 316. If the LSB is 0, the controller 316 knows that $C_x=0$ and that no coefficient values will follow the Hadamard code. The controller 316 generates a HALT UNP signal on line 323 to the NAND gate 324, thereby preventing the pointer register 318 from advancing the pointer. The counter 326 (FIG. 9C), in response to the horizontal start signal from the playback circuitry 170, begins counting clock pulses at the pixel rate, with the 8-bit counter output being provided in common to buffers 328 and 330. The buffer 328 will therefore provide to the luminance line memory 332 an address which changes at the luminance pixel rate, and the buffer 330 will provide to the chrominance line memory an address which changes at the combined chrominance pixel rate. A control clock 336 counts pulses provided at twice the pixel rate and provides alternating selection signal outputs on lines 338 and 340 to the luminance and chrominance line memories 332 and 334, respectively. The line memories 332 and 334 will therefore alternately read out the luminance and chrominance coefficients, respectively, already stored in these memories, since no changes in the coefficient values have been detected for this particular transform. In the compression process at the camera unit, after multiplexing luminance and chrominance samples as shown in FIG. 4, the order of coefficients has been determined. Thus, when reading coefficients out of the line memories 332 and 334, it is known that the first coefficient (coefficient 0) is a luminance coefficient and that luminance and chrominance coefficients alternate with one another. The luminance and chrominance coefficients will be loaded into the output registers 342 and 344, respectively, from which they will be subsequently provided to the inverse Hadamard transform circuitry (FIG. 9D) to be described later.

The reading of the coefficients from the line memories 332 and 334 continues until 32 coefficients (16 luminance and 16 chrominance) have been read out, at which time the current transform has been completed. During or at the completion of this read out of 32 coefficients, the state controller advances to state 4 in FIG. 10 where, via signalling line 346, it increases the current transform number by 1. The state counter and controller then reverts to state 3 in FIG. 10.

The Hadamard code map 306, after receiving the Hadamard code from multiplexer 320 and the OLD PTR from register 318, has provided a 3-bit value to the register 318 on line 348 representing the correct value for the next pointer. When the state controller 316 reverts to STATE 3, the signal on line 323 is removed and the register 318 is permitted to load the new pointer value. Assuming that the previous Hadamard code value was "0" as described above, the new pointer value will be increased by 1 with respect to the OLD PTR, so that the new pointer will have a value of 1 and the multiplexer 320 will provide an 8 bit output starting from the next bit position. If the Hadamard code is again 0, the same process as described above will be repeated. If the Hadamard code is some other value, e.g. 10, the map 306 will know that the transform currently being received is a transform wherein $C_x=1$, and that the Hadamard code is a 2-bit code and that information to be detected will begin 2 bits later. Accordingly, the map 306 provides on line 348 a value which is increased by two with respect to the old pointer value, and this new pointer of a value 3 is loaded into the register 318. At the next clock cycle, having determined from the least significant bit output from the multiplexer 320 that the Hadamard code is not 0, the controller 316 advances to STATE 5 and disables the map 306 via a signal on line 350.

With the register 318 providing a pointer value of 3, the 8 bits beginning with the pointed bit are provided at the output of multiplexer 320. The 5 least significant bits will be received by the PROM 352 via line 354 and will represent a 5-bit location word indicating the position of the first coefficient value to be changed in the current transform. Since the length of each coefficient is dependent upon the position of that coefficient, the PROM 352 will know the length of the coefficient value which follows the location word, and the PROM 352 will therefore provide a 3-bit coefficient length signal on line 356 to the location register 358. The controller 316, at the end of the STATE 5 operation, or when making the transition from STATE 5 to STATE 6, will provide a load signal LLR on line 360 to the register 358 to load into the register 358 both the coefficient length and coefficient position.

With the Hadamard code map 306 being disabled° when the controller 316 leaves the STATE 3 operation, the mapping PROM 362 will now provide the new pointer values. This PROM 362 will be enabled by a signal from the controller 316 on line 364 during operation in any state other than STATE 3 wherein the map 306 is enabled. The PROM 362 receives the old pointer value on line 366 from the register 318 and also receives from the register 358 the 3-bit coefficient length signal. Having received the old pointer value via line 366, and receiving a signal on line 364 indicating that the operation is currently in STATE 5, PROM 362 will provide an output on line 368 representing the new pointer value (old pointer plus 5). This new pointer value will be a 4-bit signal, 3 bits of which will represent the pointer value and will be provided via line 368 to the input of register 318. The most significant bit is tied to the most significant bit output of the Hadamard code map 306 and is provided via line 304 to the handshake circuitry 300. In this way, the 3-bit pointer value will overflow and indicate that a further bit of information is required from the frame store. By way of further explanation in the present specific example, the old pointer value at the output of register 318 is "3", and the new pointer value provided at the output of map 362 will therefore be "8". Recalling that the 16 outputs from the multiplexer 320 are designated 0-15 and that the 3-bit pointer value provided to the register 318 will have binary values 000 through 111, it will be appreciated that the bit position number 8 will correspond to the first bit contained in the register 308, and that the contents of register 310 are no longer necessary. The overflow bit provided on line 304 will indicate to the handshake circuitry 300 that a further byte of information is requested and, assuming that the signal CNT on line 302 from the frame store indicates that a further byte of information is available, the handshake circuitry 300 will control the registers 308 and 310 as described above to load a further byte of information into the register 308 while transferring the contents of register 308 to the register 310. Also, recalling that the pointer is a 3-bit pointer having values 000 through 111, it will be appreciated that the pointer value of "8" will constitute an overflow of the pointer to a value of 000. Thus, the pointer will now be pointing to the 0 bit position at the output of multiplexer 320, and a new byte will have been loaded into the register 308.

With the pointer at the 0 bit position, the first 8 bits in the multiplexer 320 will be provided as an output to the coefficient register 370. The PROM 362 will know the coefficient length and will know the old pointer value and will also receive a signal on line 364 from the controller 316 indicating that operation is now in STATE 6. At the end of STATE 6, the PROM 362 will therefore provide at its output on line 368 a new pointer value which is the old pointer value increased by the number of bits in the coefficient, and just before the pointer value on line 368 changes at the end of the state 6 operation, a signal LCOF on line 372 from the controller 316 to the coefficient register 370 will cause the register 370 to load the 8 bits currently being provided at the output of multiplexer 320. The 8 bits from coefficient register 370 are provided to the multiplexer 374 and to the sign bit extension PROM 376. The PROM 376 examines all 8 bits of the content from register 370 and, with the assistance of the signal on line 378 from the location register 358 indicating the number of bits in the coefficient, the PROM 376 knows how many of the 8 bits represent the coefficient value. The PROM 376 then provides an output on line 380 in which the sign bit is extended through all invalid bit positions.

The multiplexer 370 is only provided due to the fact that the PROM 376 is a two-part PROM and, in the absence of the multiplexer 370, the sign bit in the output of the register 370 would only address one part of the two-part PROM 376. The multiplexer 370 therefore extracts the sign bit and provides the sign bit information to the half of the PROM 376 which would not otherwise receive this sign bit information. The multiplexer 374 could, of course, be dispensed with depending on the type of memory used in the PROM 376.

During STATE 7 operation, the current transform number is provided from the controller 316 on line 382 to the registers 384 and 386 (FIG. 9C). The output from the location register 358 on line 388 will represent the location of the coefficient whose value is represented by the output from PROM 380. Since the luminance and chrominance coefficients alternate, the even or odd state of the output from register 358 will indicate whether the coefficient is a luminance or chrominance coefficient. Accordingly, the LSB of the output on line 388 is provided to the control clock 336 and to a gate circuit 390, via line 392, to inform those circuits as to whether the new coefficient value is a luminance or chrominance coefficient. The controller 316 will provide to the gate circuit 390 a signal on line 394 indicating STATE 7 operation and, at the next clock pulse after commencement of STATE 7 operation, the gate circuit 390 will provide a load signal to either register 396 or register 398 depending on whether the coefficient value is a luminance or chrominance coefficient as indicated by the signal on line 392. The control clock 336 will also receive the signal indicating STATE 7 operation and, depending upon the luminance or chrominance value indicated on line 392, will select either the luminance or chrominance line memory for writing the content of the respective input register. The address at which the coefficient value is to be written will be provided by the appropriate one of registers 384 and 386, which receive the current transform number on line 382 from the controller 316 and which also receive via line 400 the four MSB's from line 388 which indicate the particular coefficient in the transform.

As described above, the controller 316 receives the least significant bit output from the multiplexer 320. With the controller currently in STATE 7 operation, it knows from this least significant bit signal whether the T-bit is a 1 or a 0, and therefore knows whether to go to STATE 4 or STATE 5 in the state diagram of FIG. 10. The operation then continues in a manner which will be apparent from the above description and need not be described in further detail.

In this manner, the read counter 326 will provide addresses to the memories 332 and 334 to cause the memories 332 and 334 to alternately provide luminance and chrominance coefficient outputs. Whenever a changed coefficient value is received, it will be written into the appropriate memory 332 or 334 from the corresponding input register 396 or 398 at an address defined by the current transform number and coefficient number within that transform, both of which values are provided to the registers 384 and 386.

The read address provided from the read counter 326 should lag behind the write address provided from the registers 384 and 386, to thereby ensure that the coefficient for a particular line is updated before that coefficient value is read out. This, however, will be of no concern since the writing operation will inherently proceed at a much faster rate than the reading operation. This can be easily appreciated by noting that the read operation requires the reading out of all coefficients on a line, whereas the information to be written comprises only a small proportion of the coefficients on each line and can proceed as fast as the compressed data can be processed. A more practical concern is that the write operation may advance more than one line ahead of the read addresses, thereby writing coefficients of line i+2 into the memories 332 and 334 before the system has had a chance to read from those memories the corresponding coefficient values from line i+1. In order to ensure that this overrun does not occur, the four MSB's from the read counter output are provided to the controller 316 for comparison with the current transform number, i.e. the number of the transform currently being processed in the unpacker. If the current transform number approaches too closely to the transform being read out, the controller 316 will generate a HALT X signal on line 402 which will result in a CHALT condition indicating that the state should not be advanced, as is illustrated in the state diagram of FIG. 10.

The unpacker will run on a demand basis but can be halted for various conditions. One such condition is the overlap of the read and write addresses to the line memories 332 and 334 as described above. A second condition for interrupting the unpacker would be the generation of a NEED 1 signal to the handshake circuitry 300 indicating the need for a further byte of information to be loaded into the register 308, and the simultaneous indication by the signal CNT from the frame store that a further byte is not yet available. This will result in the generation by the handshake circuitry 300 of a signal RHALT which will result in the disabling of register 318 through the NAND gate 324 as described earlier. The RHALT and the HALT X signals can be logically combined in a simple OR gate within the controller 316 to generate the CHALT signal which freezes the current state as illustrated in FIG. 10.

It can be seen that the unpacking, decoding and reading operations described with reference to FIGS. 9A-9C and 10 inherently also perform the demultiplexing of luminance and chrominance coefficients, so that the separate luminance and chrominance Hadamard coefficients can be provided to inverse Hadamard transform circuits 400 and 402, respectively, illustrated in FIG. 9D. The internal details of these inverse Hadamard transform circuits are known in the art and merely perform the exact reverse operation of that accomplished in the Hadamard transform circuitry previously discussed with reference to FIGS. 2 and 3. The output of circuit 400 will comprise 16 values representing the luminance of 16 pixels, and the output of circuit 402 will comprise 16 interleaved B-Y and R-Y chrominance signals corresponding to those 16 pixels. The interleaved chrominance pixel signals can be demultiplexed in a common 1:2 demultiplexer 402 and can be provided together with the luminance pixel information to well known signal processing circuitry 406 for converting the digital signals into an analog NTSC signal for display on a television screen.

As can be seen from the above description of the present invention, significant compression of video signals can be achieved by converting the pixel information to Hadamard coefficients, entropy encoding the Hadamard coefficients by representing the earliest coefficients by larger numbers of bits and decreasing the number of bits toward the end of each 16-coefficient transform, utilizing a unique Huffman code and sending only selected changed coefficient values and by packing and smoothing the encoded signals.

The overall image recording portion of the system may be configured as illustrated in FIG. 12. An image projected onto the image array 500 through the lens system 502 is detected by the array, and the array output is then corrected and converted to digital form in a known manner and correction and conversion circuit 504. The data is then provided to Hadamard transform circuit 100, the output of which is provided to a Huffman coefficient and compression checksum circuit 506 which may perform the functions of all of components 110, 120, 130 and 140 in FIG. 1. The output of the circuit 506 is then provided to the smoothing circuitry 150.

The record signal processing circuitry 160 is FIG. 1 may comprise one or more shift registers 508 for receiving bytes of information from the smoothing memory, Xerxes encoding circuitry 510 for receiving and encoding the bytes of information, and recording amplifiers 512 for forwarding the encoded information to plural recording heads 514. Pulse code modulation circuitry 516 is preferably provided for modulating audio information from microphones 518 and for providing the audio information to the encoding circuitry 510 for encoding together with the image information. The system includes a timing and clock oscillator circuit 520 for providing timing signals to the various system components, and control circuitry 522 for controlling the head movement mechanisms 524 and drive motors 526.

Figure 13:
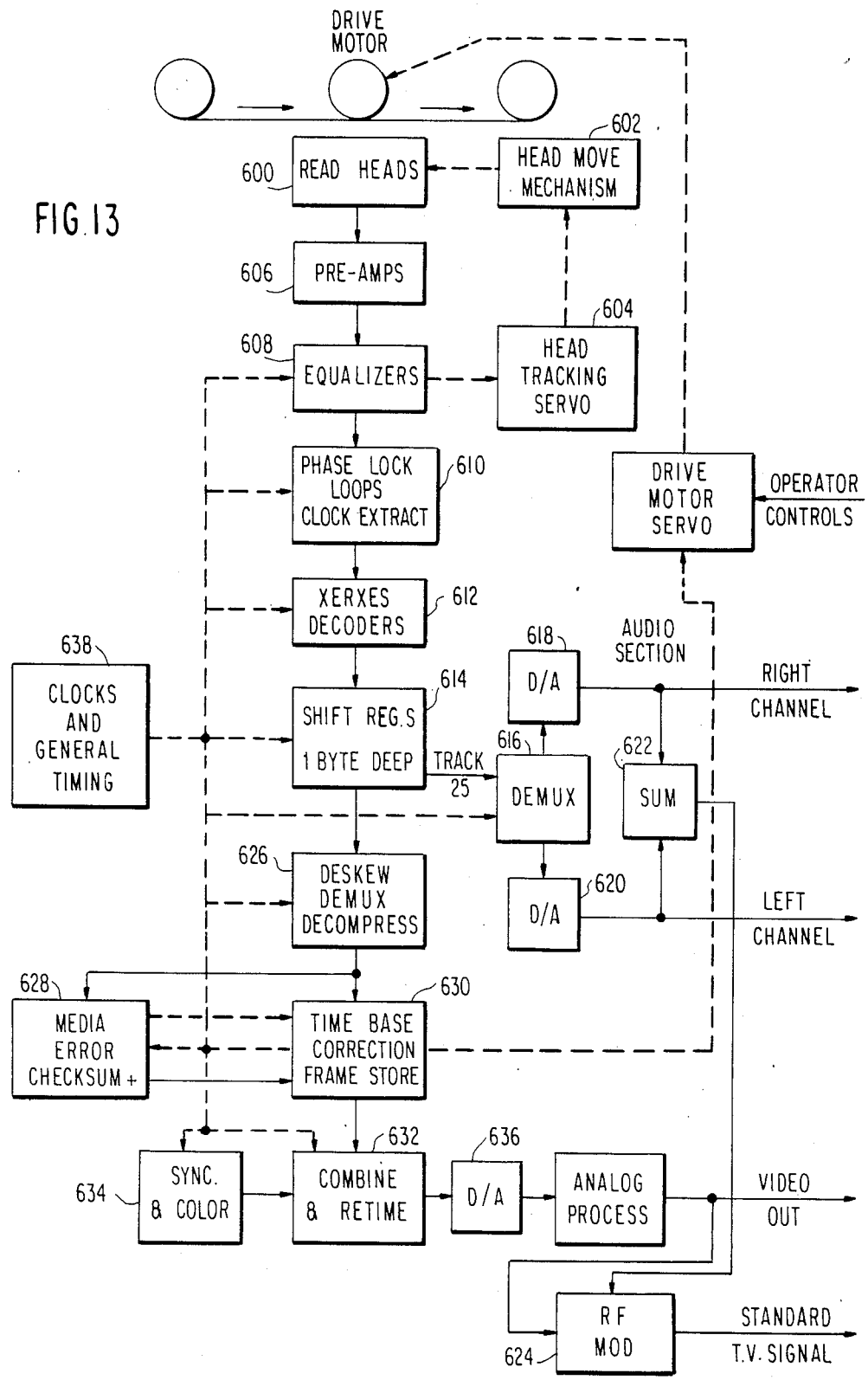
FIG. 13 is an overall block diagram of the playback portion of the system according to the present invention.

The playback portion of the system may be as generally illustrated in FIG. 13, and may typically include a plurality of read heads 600 with associated movement and tracking servo-mechanisms 602 and 604, respectively, preamplifiers 606 for forwarding the outputs from the read heads 600, equalizers 608 for equalizing the pre-amplified data, phase lock loop and clock extraction circuitry 610, Xerxes decoders 612 (if similar encoders were used in the recording circuitry), and a frame memory shift register 614 for providing bytes of reproduced information. An audio section demultiplexes the audio information in the demultiplexer 616 and converts the audio information to analog form in D/A converters 618 and 620. The left and right audio channels can be combined at 622, with the combined audio signal being provided to RF modulator 624 for subsequent combination with the video output signal to generate a standard television signal.

The video data received from the shift register(s) 614 is provided to deskew, demultiplexing and decompression circuitry 626 which preferably performs all of the functions of the components 180, 190, 200 and 210 in FIG. 1, and media error checksum and time base correction circuits 628 and 630, respectively. The time-corrected data is then combined in combination and retiming circuitry 632 with synchronization and color information from circuitry 634, the composite signal is then converted to analog form and D/A converter 636, and the analog signal is then processed, as necessary, to generate a video signal output. Timing control circuitry 638 provides timing and control signals to various components in the system.

The detailed operation of the various individual components illustrated in FIGS. 12 and 13 need not be discussed in detail, since the various individual components and operations are known in the art. It should be noted, however, that an additional degree of data "compression" may be obtained by operating the camera at a frame rate of 15 frames/second while operating the playback unit at a rate of 60 frames/second by virtue of its frame store.

What is claimed is:

1. A method of recording and reproducing a plurality of lines of video data with each line including a plurality of image signals, said method being of the type comprising the steps of generating digital image signals from an imaging array, compressing said image signals to obtain compressed data, recording said compressed data on a recording medium, reproducing said compressed data from said recording medium, decompressing said reproduced data and displaying said decompressed data, the improvement characterized in that said compressing step comprises:

calculating the Hadamard transform of a first group of said image signals from a first line to thereby generate a first group of Hadamard coefficients;

comparing said first group of Hadamard coefficients with the Hadamard coefficients from a corresponding group of image signals from a previous line to determine which coefficient values have changed with respect to their corresponding coefficient values from said previous line;

generating a coding signal representing the number of coefficients in said first group which have changed; and combining said coding signal and said changed coefficient value into a first compression signal.

2. A method as defined in claim 1, wherein said step of generating a coding signal comprises generating a first coding signal when no changes are detected in said first group of Hadamard coefficients and generating at least a second coding signal when some changed coefficient values are detected.

3. A method as defined in claim 2, wherein said step of generating a coding signal further comprises the step of generating a position code representing the position of a changed coefficient value within said first group of Hadamard coefficients, said combining step comprising combining said coding signal, position code and changed coefficient value into said first compression signal.

4. A method as defined in claim 3, wherein there are K coefficients in said first group and wherein said generating step comprises generating a first coding signal when no changed coefficient values are detected, a second coding signal when L changed values are detected, a third coding signal when M changed values are detected and a fourth coding signal when N changed values are detected, where L, M and N are all positive integers with $O<L<M<N \leq K$, each of said first through fourth coding signals comprising $J_O$, $J_L$, $J_M$ and $J_N$ bits, respectively, where $J_O<J_N$ and $J_O \leq J_L \leq J_M \leq J_N$.

5. A method as defined in claim 3, wherein said combining step comprises successively selecting said coding, position and changed coefficient value signals at a multiplexer output as said first compression signal containing both valid and invalid bits, said method further comprising the step of packing said first compression signal, said packing step comprising the step of:

receiving successive multiplexer outputs in a shift register;

generating a packing signal representing the number of valid bits in each multiplexer output; and storing said multiplexer outputs in said shift register in accordance with said packing signal to substantially eliminate said invalid bits from said first compression signal.

6. A method as defined in claim 5, further comprising the steps of:

shifting out, at an erratic rate, the contents of said shift register as a second compression signal comprising successive packed multi-bit words;

storing said second compression signal as stored data in a smoothing memory; and reading said stored data out of said smoothing memory at a substantially constant rate as a third compression signal.

7. A method as defined in claim 6, further comprising the step of generating said second value comparison signal for at least one coefficient in each successive group, with the position of said at least one coefficient being different between successive groups.

8. A method as defined in claim 6, wherein said reproducing step comprises reproducing said third compression signal from said recording medium and said decompressing step comprises:

(a) receiving said reproduced third compression signal in an unpacking shift register;

(b) generating a pointer signal;

(c) reading data out of said unpacking shift register in accordance with said pointer signal;

(d) providing data read out from said shift register to pointer mapping means and generating in said pointer mapping means a new pointer signal in accordance with the data read out from said unpacking shift register; and (e) repeating steps (c) and (d) above.

9. A method as defined in claim 8, wherein said decompressing step further comprises:

storing changed coefficient values in a decompression memory at memory locations determined in accordance with said position signals, said decompression memory storing at least one line of coefficient values;

reading coefficient values out of said decompression memory; and calculating the inverse Hadamard transformation of said coefficients to recover said image signals.

10. A method as defined in claim 1, wherein said first group of Hadamard coefficients includes N coefficients, where N is a positive integer, said method further comprising the step of discontinuing said comparing step after M changed coefficient values are detected in any particular group of Hadamard coefficients, whereby a maximum of M changed coefficient values are combined into said first compression signal, wherein M is an integer less than N.

11. A method as defined in claim 1, wherein said first group of Hadamard coefficients includes N coefficients designated, in order, $HC_0$-$HC_{N-1}$, respectively, with coefficient $HC_0$ being represented by a greater number of bits than coefficient $HC_{N-1}$.

12. A method as defined in claim 1, wherein said comparing step comprises generating a comparison signal having a first value when a present coefficient and a corresponding coefficient from a previous line have the same value and a second value when said present and corresponding coefficients have different values, said comparison step further comprising generating a second value comparison signal for at least one coefficient in said first coefficient group regardless of the result of comparison between said one coefficient and its corresponding coefficient from a previous line.

13. A system for recording and reproducing a plurality of lines of video data with each line including a plurality of image signals, said system being of the type having imaging means for generating digital image signals, compression means for compressing said image signals to obtain compressed data, recording means for recording said compressed data on a recording medium, reproducing means for reproducing said compressed data from said recording medium, decompressing means for decompressing said reproduced data, and display means for displaying said decompressed data, the improvement characterized in that said compressing means comprises:
calculating means for calculating the Hadamard transform of a first group of said image signals from a first line to thereby generate a first group of Hadamard coefficients;
comparison means for comparing said first group of Hadamard coefficients with the Hadamard coefficients from a corresponding group of image signals from a previous line to determine which coefficient values have changed with respect to their corresponding coefficient values from said previous line;
generating means for generating a coding signal representing the number of coefficients in said first group which have changed values; and
combining means for combining said coding signal and said changed coefficient values into a first compression signal.

14. A system as defined in claim 13, wherein said comparing means comprises:
line memory means for storing coefficient values corresponding to said previous line;
a comparator for comparing each coefficient in said first group with the corresponding coefficient from said line memory means, said comparator providing a first value comparison signal when the compared coefficient values are the same and providing a second value comparison signal when the compared coefficient values differ.

15. A system as defined in claim 14, wherein said generating means comprises:
difference counting means (216) for counting the output signals from said comparator having said second value;
coefficient counting means (222) for counting the number of coefficients provided to said comparator and providing a completion signal output when all coefficients in a group have been compared; and
mapping means (218) responsive to the output from said difference counting means for generating said coding signal in accordance with the value in said difference counting means at the time the value in said coefficient counting means indicates that all of said first group of coefficients have been provided to said comparator.

16. A system as defined in claim 15, wherein said combining means comprises:
a transform memory (206) for storing said first group of Hadamard coefficient values together with their corresponding outputs from said comparator to indicate whether each coefficient value is a changed value;
multiplexing means for receiving at least said coding signal, the output from said coefficient counter and the coefficient values read out from said transform memory and being responsive to a selection signal for successively selecting any one of its inputs; and
control means (214) responsive to at least said coding signal and said coefficient counter output for providing said selection signal to said multiplexing means.

17. A system as defined in claim 16, further comprising down counter means (226) responsive to said completion signal from said coefficient counter for storing the output from said difference counter, said down counter means receiving and counting down the second-valued difference signals from said transform memory and providing a termination signal output when the last changed coefficient value in said first group of coefficients has been read out of said transform memory.

18. A system as defined in claim 14, wherein said comparison means further comprises means for generating a second-valued comparison signal as said comparator output for at least one coefficient in said first group regardless of the result of comparison between said at least one coefficient and its corresponding coefficient from said previous line.

19. A system as defined in claim 15, further comprising means for disabling said comparator when a predetermined number of changed coefficient values have been detected, said predetermined number being less than the number of coefficient values in said first group.

20. A system as defined in claim 16, further comprising shift register means (220) for storing successive outputs from said comparator, the output of said shift register means being provided as an input to said multiplexing means.

21. A system as defined in claim 16, wherein the output of said multiplexing means includes both valid and invalid bits, said system further comprising packing means for substantially removing said invalid bits, said packing means comprising:
packing shift register means for receiving successive outputs from said multiplexing means and storing said multiplexer outputs in accordance with a packing signal representing the number of valid bits in each multiplexer output;
said control means generating said packing signal.

22. A system as defined in claim 21, wherein said packing shift register provides packed output words at an erratic rate, said system further comprising a smoothing memory and smoothing means for storing said packed words in said smoothing memory and for reading data out of said smoothing memory at a substantially constant rate.

23. A system as defined in claim 22, the improvement further characterized in that said decompressing means comprises:
unpacking shift register means for receiving data reproduced from said recording medium;

means for generating a pointer signal;

means for reading data out of said unpacking shift register means in accordance with said pointer signal;

means responsive to said data read out from said unpacking shift register for updating said pointer signal; and means for providing updated pointer signal to said unpacking shift register means for read out of subsequent data.

24. A system as defined in claim 23, wherein said means for generating a pointer signal and means for updating said pointer signal comprise a mapping means providing an output in accordance with an input, said mapping means receiving as its input a current pointer signal and current data being read out from said unpacking shift register and providing its output as said pointer signal to said unpacking shift register means.

25. A system as defined in claim 23, wherein said decompressing means further comprises:

decompression memory means for storing changed coefficient values read out of said unpacking shift register means, said decompression memory means storing at least one line of coefficient values;

means for reading coefficient values out of said decompression memory means; and inverse calculating means for calculating the inverse Hadamard transform of the coefficients read out of said decompression memory means, to thereby recover said image signals.

* * * * *